United States Patent [19]
Richardson et al.

[11] Patent Number: 6,070,134
[45] Date of Patent: May 30, 2000

[54] IDENTIFYING SALIENT SEMANTIC RELATION PATHS BETWEEN TWO WORDS

[75] Inventors: Stephen D. Richardson; William B. Dolan, both of Redmond, Wash.

[73] Assignee: Microsoft Corporation, Redmond, Wash.

[21] Appl. No.: 08/904,418

[22] Filed: Jul. 31, 1997

[51] Int. Cl.$^7$ .................................................. G06F 17/30
[52] U.S. Cl. .......................................................... 704/9
[58] Field of Search ..................... 704/1, 9, 10; 707/530, 707/531, 532

[56] References Cited

U.S. PATENT DOCUMENTS

| | | | |
|---|---|---|---|
| 5,325,298 | 6/1994 | Gallant ........................................ | 704/9 |
| 5,675,819 | 10/1997 | Schuetze ..................................... | 704/9 |
| 5,724,593 | 3/1998 | Pentheroudakis ........................... | 704/9 |
| 5,752,052 | 5/1998 | Richardson et al. ........................ | 704/9 |
| 5,933,822 | 8/1999 | Branden-Harder et al. ................ | 707/5 |

OTHER PUBLICATIONS

Alshawi, H. and D. Carter, "Training and Scaling Preference Functions for Disambiguation," *Computational Linguistics* 20(4):635–648, 1994

Bookman, L., *Trajectories Through Knowledge Space: A Dynamic Framework for Machine Comprehension*, Kluwer Academic Publishers, Boston, MA, 1994.

Braden–Harder, L., *Natural Language Processing: The PLNLP Approach*, Kluwer Academic Publishers, Boston, MA, 1993, Chap. XIX, "Sense Disambiguation Using Online Dictionaries," pp. 247–261.

Grishman, R. and J. Sterling, "Generalizing Automatically Generated Selectional Patterns," in Proceed of Coling 94 of the 15$^{th}$ International Conference on Computational Linguistics, vol. II, Kyoto, Japan, Aug. 5–9, 1994, pp. 742–747.

Salton, G. and M. McGill, *Introduction to Modern Information Retrieval*, McGraw–Hill Publishing Company, New York, 1983.

Sumita, E. and H. Iida, "Experiments and Prospects of Example–Based Machine Translation," in Proceedings of the 29$^{th}$ Annual Meeting of the ACL, 1991, pp. 185–192.

Wilks, Y. et al., "Providing Machine Tractable Dictionary Tools," in J. Pustejovsky (ed.), *In Semantics and the Lexicon*, Kluwer Academic Publishers, Boston, MA, 1992, pp. 99–154.

*Primary Examiner*—Vivian Chang
*Assistant Examiner*—Patrick N. Edouard
*Attorney, Agent, or Firm*—Westman, Champlin & Kelly, P.A.

[57] ABSTRACT

The present invention identifies salient semantic relation paths between two words using a knowledge base. For a group of semantic relations occurring in the knowledge base, the facility models with a mathematical function the relation between a frequency of occurrence of unique semantic relations and the number of unique semantic relations that occur at that frequency. This mathematical function has a vertex frequency identifying a transition point in the mathematical function. The facility then determines the level of salience of unique semantic relations of the group such that the level of salience of unique semantic relations increases with the frequency of occurrence of the unique semantic relations approaches the vertex frequency of the mathematical function with which the relation between the frequency of occurrence of the unique semantic relations and the number of unique semantic relations occurring at that frequency is modeled. The facility is then able to determine the level of salience of a particular path between two words by combining the levels of salience determined for the semantic relations in the path.

31 Claims, 18 Drawing Sheets

Semantic Relation Frequency Table /‾ 1400

| semantic relation | | | frequency |
|---|---|---|---|
| first word | relation type | second word | |
| float | TypicalSubject | cloud | 3 |
| float | TypicalSubject | boat | 11 |
| give | TypicalSubject | people | 37 |
| ⋮ | | | |

Fitted Power Function Table — 1500

| relation type | semantic relation, first part, or second part | a | b |
|---|---|---|---|
| TypicalObject | semantic relation | 2097 | -2.28 |
| TypicalObject | first part | • | • |
| TypicalObject | second part | • | • |
| Part | semantic relation | • | • |
| Part | first part | | |
| Part | second part | | |
| Hypernym | semantic relation | | |
| Hypernym | first part | | |
| Hypernym | second part | | |
| • | • | | |
| • | • | | |
| • | • | | |

IDENTIFYING SALIENT SEMANTIC RELATION PATHS BETWEEN TWO WORDS

TECHNICAL FIELD

The invention relates generally to the field of computational linguistics, and, more specifically, the field of analyzing semantic relationships between words.

BACKGROUND OF THE INVENTION

A semantic relationship knowledge base is a body of data that identifies relationships in meaning between pairs of words. These relationships are represented as a "semantic relation path." A semantic relation path is a sequence of one or more semantic relations, which each have a relation type that relates the meanings of two words. For example, such a knowledge base might include the following semantic relation paths between the words "boat" and "water":

$$\text{boat-Purpose} \rightarrow \text{travel-Location} \rightarrow \text{water} \quad (1)$$

$$\text{boat} \leftarrow \text{TypicalSubject-float-Location} \rightarrow \text{water} \quad (2)$$

Semantic relation path (1) contains two relations, "boat-Purpose→travel" and "travel-Location→water," and relates the meaning of "boat" and "water" by indicating that a boat has a purpose of traveling in water. Semantic relation path (2) similarly contains two relations, and relates the meaning of "boat" and "water" by indicating that a boat typically floats in water.

Many fields of endeavor can gainfully utilize a knowledge base that identifies the salient semantic relationships between pairs of words. For example, in natural language parsing, when a parser encounters a modifying phrase, it needs to identify the word or phrase that the modifying phrase modifies. This is also known as identifying the "attachment point" of the modifying phrase. For example, when parsing the sentence We observed the bird with a telescope.

a parser must determine whether the modifying phrase with a telescope"modifies the verb "observe," or the noun "bird." This is tantamount to determining whether the semantic relation path (3)

$$\text{observe-Means} \rightarrow \text{telescope} \quad (3)$$

or similar less direct paths are more salient than either of the semantic relation paths (4) and (5)

$$\text{bird} \leftarrow \text{Possess-telescope} \quad (4)$$

or $$\text{bird-Part} \rightarrow \text{telescope} \quad (5)$$

or similar less direct paths. Based on a determination that the degree of saliency of semantic relation path (3) exceeds the degree of saliency of semantic relation paths (4) and (5), the parser would conclude that the modifying phrase "with a telescope" modifies the verb "observe." An effective approach to automatically weighting the relative saliency of semantic relation paths would therefore have significant utility.

SUMMARY OF THE INVENTION

The present invention is directed to identifying and weighting the saliency of semantic relation paths between a pair of words. A large number of semantic relation structures are automatically generated from a corpus, such as a dictionary. The semantic relation structures each contain a network of semantic relations. Each semantic relation has a relation type that relates the meanings of two words.

The invention identifies in the semantic relation Structures distinct series of semantic relations, or "paths," that connect the pair of words. The weight of each of these paths is computed from individual weights for each semantic relation in the path.

The weight of a semantic relation is determined based on the proximity of the frequency of occurrence of the semantic relation the semantic relation structures to an intermediate frequency for relations of the same relation type. Semantic relations having a frequency close to the intermediate frequency receive a weight larger than the weights received by semantic relations whose frequencies are further from the intermediate frequency.

In order to determine the overall weight for a path within a single semantic structure, the weights of the semantic relations in the path are combined to yield the overall weight of the path. This weight constitutes a quantitative assessment of the saliency of the path relative to other paths. When the most salient paths between two words are desired, the invention may be applied to weight each possible path between the two words, and the paths having the highest weights may be selected.

The invention also computes weights for extended paths made up of two subpaths from different semantic relation structures. In order to do so, the invention calculates weights for each of the subpaths, then multiplies these weights together with the weight of a special "join" relation that represents the uncertainty that the intersection word through which the subpaths are joined have the same meaning in the two different semantic relation structures.

BRIEF DESCRIPTION OF THE DRAWINGS

FIG. 14 is a data structure diagram showing a semantic relation frequency table.

FIG. 15 is a data structure diagram showing it power function table.

DETAILED DESCRIPTION OF THE INVENTION

Figure 1:
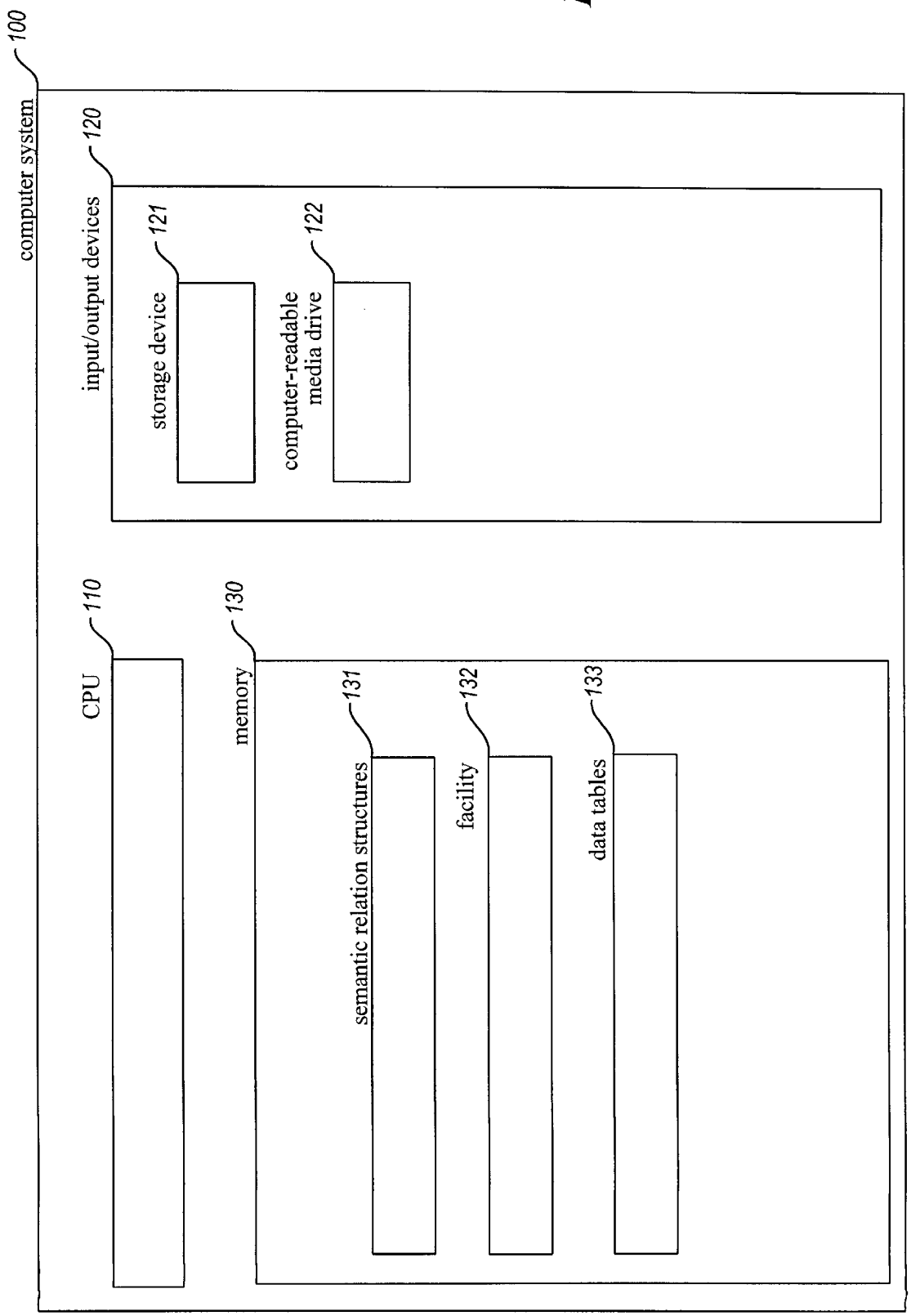
FIG. 1 is a high-level block diagram of the general-purpose computer system upon which the facility preferably executes.

The invention is directed to a path weighting, software facility ("the facility") for assessing the saliency of semantic relation paths between two words provided by a lexical knowledge base. A lexical knowledge base is a network of semantic relations, each having a relation type that directionally characterizes the relationship between the meaning of two words. For example, the semantic relation:

$$\text{boat-Part} \rightarrow \text{keel} \tag{6}$$

indicates that a keel is part of a boat. The following is a list of sample relation types: Cause, Domain, Hypernym, Location, Manner, Material, Means, Modifier, Part, Possessor, Purpose, QuasiHypernym ("Quespernym"), Synonym, Time, TypicalObject, TypicalSubject, and User. The lexical knowledge base is preferably automatically derived from a large natural language corpus such as a dictionary, and is organized as a set of relation structures. Each relation structure is comprised of one or more semantic relations that are all derived from a single dictionary definition or usage example. When two particular words exist in the same relation structure, semantic relations within the relation structure provide a path between the two words. A semantic relation path (or simply "path") between two words is a series of one or more semantic relations that relates the meanings of the two words.

For example, a lexical knowledge base may (contain relation structures providing the following additional paths, which are useful to identify relationships in meaning between the words "boat" and "water":

$$\text{boat-Purpose} \rightarrow \text{travel-Location} \rightarrow \text{water} \tag{7}$$

$$\text{boat} \leftarrow \text{TypicalSubject-carry-TypicalObject} \rightarrow \text{water} \tag{8}$$

$$\text{keel-Location} \rightarrow \text{water} \tag{9}$$

Semantic relation path (7) contains two semantic relations, and indicates that a boat has a purpose of traveling in water, and directly relates the meaning of "boat" and "water." Semantic relation path (8) contains two semantic relations, and indicates that a boat typically carries water, and directly relates the meaning of "boat" and "water." Semantic relation path (6) contains one semantic relation, and indicates that a keel is part of a boat. Semantic relation path (9) contains one semantic relation, and indicates that a keel is located in water. Semantic relation paths (6) and (9) together relate the meaning of "boat" and "water." The path produced by joining paths (6) and (9) is known as an extended path, as it includes relations from more than one relation structure. Any two semantic relation paths with one ending word (e.g., keel) in common can be joined to form an extended path. Extended paths frequently prove less salient than nonextended paths. As discussed above, a nonextended path is generated from a single dictionary definition or usage example and, consequently, each word in the nonextended path can have only one meaning. Nonextended paths joined to form an extended path may have been formed using different senses of the word at which the paths are joined. For example, if the subpath "pool-TypicalObject→funds," which uses a verb sense of the join word "pool," is obtained from a first relation structure, and the subpath "swim-Location→pool," which uses a noun sense of the join word "pool," is obtained from a second relation stricture, the extended path formed by joining them is incoherent because the first part of the extended path uses the join word "pool" as a verb, while the second part of the extended path uses it as a noun. Because all extended paths run a similar risk, the facility reduces the weights of all extended paths to reflect the possibility that the senses in which the join word is used are inconsistent.

Robust lexical knowledge bases often contain large numbers of paths between many word pairs. It is therefore important to be able to distinguish from a large number of semantic paths between a pair of words the semantic paths most likely to relate the meanings of the words in a useful way. In accordance with the invention, the semantic paths most likely to relate the meanings of a pair of words in a useful way are those that are most immediately identified by a human language user when presented with the pair of words.

The invention ranks the paths between a pair of words by computing a relative quantitative rating, or "weight" for each of these paths. A particular path's weight is computed by determining a weight for each semantic relation in the path, then multiplying those weights together. The weight of a semantic relation is based upon the number of times the semantic relation occurs in the lexical knowledge base, called the semantic relation's "frequency." The weight generated by the facility for each semantic relation favors semantic relations having intermediate frequencies, based upon an observation that semantic relations having either very small or very large frequencies tend to be less salient. For example, if the corpus contains one occurrence of the sentence "The gravy was in the gravy boat," then semantic relation "gravy-location→boat" has frequency 1. Because the existence of this semantic relation and the lexical knowledge base is based upon a single sentence in the corpus, it is likely seldom used by human language users, and may further suffer from statistical insignificance. Semantic relations with extremely high frequencies may also be less salient. For example, while the occurrence in the corpus of many sentences similar to "The adjective 'easy' modifies nouns, such as 'text,' to indicate that they have a low level of difficulty" causes the frequency of the semantic relation "modify-TypicalObject→noun" to be relatively large, this semantic relation does not impart much additional useful information, as adjectives usually modify nouns. Because of these shortcomings in the saliency of extremely lowfrequency semantic relations and extremely high-frequency semantic relations, the facility preferably weights semantic relations in a way that favors those with intermediate frequencies.

As is discussed in greater detail below in conjunction with equation <1>, the facility generates a weight for each semantic relation that is based upon the smaller of (A) the semantic relation's frequency and (B) the number of different semantic relations of the same relation type having the same frequency. For example, if a first semantic relation has a frequency of 7 and 28 different semantic relations of the same relation type have the frequency 7, then the facility bases the weight of the first semantic relation on the frequency 7. On the other hand, if a second semantic relation has a frequency of 37 and 2 different semantic relations of the same relation type have the frequency 37, then the facility bases the weight of the second semantic relation on the frequency count 2. The use of the combination of these two values tends to weight most heavily semantic relations having intermediate frequencies, based on an observation that the most salient semantic relations have intermediate frequencies. When determining the weight of a semantic relation having very small frequency, the facility preferably bases the weight of the semantic relation, at least in part, on separate weights for the two semantic relation parts making up the relation: (A) a first semantic relation part comprising the first word with the relation type, and (B) a second semantic relation part comprising the relation type with the second Word. For example, the semantic relation "float-TypicalSubject→cloud" is composed of a first semantic relation part "float-TypicalSubject→" and a second semantic relation part "-TypicalSubject→cloud".

In order to determine the weight of an entire path, the facility combines the individual semantic relation weights of the semantic relations making up that path. Before so combining the individual semantic relation weights, however, the facility preferably normalizes these individual semantic relation weights for combination. In one embodiment of the invention, the normalized weight of a path is roughly conceptualized as the probability of a hypothetical human language user selecting that path when asked to select a valid and salient path at random. This probability is expressed as a number between zero and one, and is calculated by multiplying together the probabilities of the hypothetical human language user selecting each of the semantic relations of the path. Because the first semantic relation in the path may be selected by the hypothetical human language user from among all valid semantic relations, the probability of selecting the first semantic relation in the path is equal to the number of occurrences of that particular semantic relation in the knowledge base (its frequency, as modeled by the semantic relation weight described above), divided by the total number semantic relation occurrences in the knowledge base. After selecting the first semantic relation in the path, however, the hypothetical human user is constrained to selecting semantic relations that have as their first word the second word of the preceding semantic relation. The probability of the hypothetical human user selecting such subsequent semantic relations in a path is therefore the frequency of the subsequent semantic relations divided by the number of occurrences of semantic relations in the knowledge base having as their first word the second word of the preceding semantic relation.

The facility preferably also adjusts the weights of adjacent semantic elations obtained from separate relation structures of the lexical knowledge base. As is discussed elsewhere herein, paths containing semantic relations obtained from separate relation structures of the lexical knowledge base are known as "extended paths." Because the word that the adjacent semantic relations have in common may be used in two different senses in the two different relation structures, the weight of the path containing these semantic relations is preferably reduced to reflect the possibility that the semantic relations from the different relation structures use the common word in different senses having different meanings.

FIG. 1 is a high-level block diagram of the general-purpose computer system upon which the facility preferably executes. The computer system 100 contains a central processing unit (CPU) 110, input/output devices 120 and a computer memory (memory) 140. Among the input/output devices is a storage device 121, such as a hard disk drive, and one or more computer-readable media drives 122, which can be used to install software products, including the facility, that are provided on a computer-readable medium, such as a CD-ROM. The memory 140 preferably contains the semantic relation structures 141, the path weighting facility, (facility) 142, and data tables 143 used by the facility, such as the semantic relation frequency and power function tables discussed below in conjunction with FIGS. 14 and 15. While the facility is preferably implemented on a computer system configured as described above, those skilled in the art will recognize that it may also be implemented on computer systems having different configurations.

Figure 2:
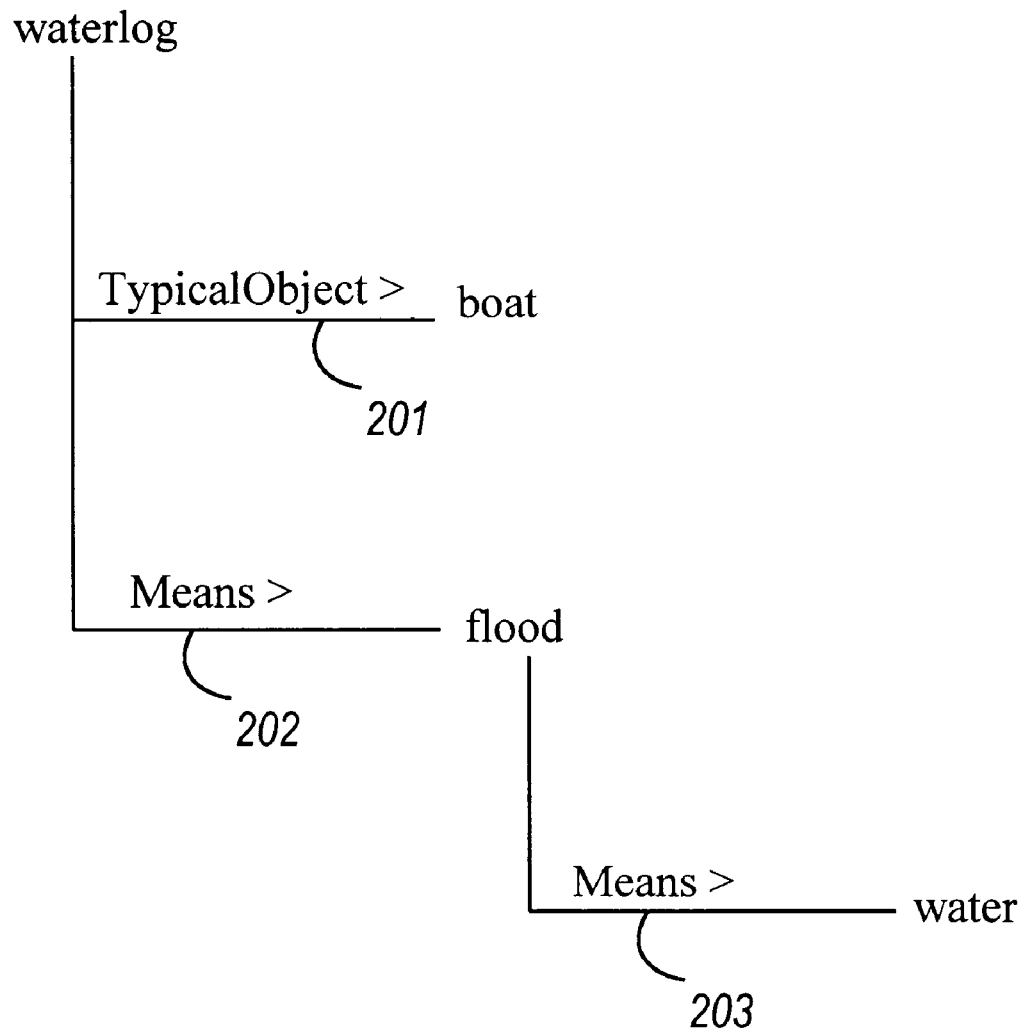
FIG. 2 shows a semantic relation structure constructed from a usage example occurring in a dictionary entry for the word "waterlog."

FIGS. 2–10 show semantic relation structures that relate the meaning of the words "boat" and "water." FIG. 2 shows a semantic relation structure constructed from a usage example occurring in a dictionary entry for the word "waterlog." This semantic relation structure is comprised of three individual semantic relations, semantic relations 201, 202, and 203. Semantic relation 201 indicates that the noun "boat" is typically the object of the verb "waterlog":

waterlog-TypicalObject→boat (10)

Semantic relation 202 indicates that flooding is the means by which something is waterlogged:

waterlog-Means→flood (11)

Semantic relation 203 indicates that water is the means by which something is flooded:

flood-Means→water (12)

This semantic relation structure may be used to relate the meanings between any pair among the words "waterlog," "boat," "flood," and "water" by extracting the path, comprised of semantic relations, between the pair of words. For example, the words "waterlog" and "water" are related by the path comprised of semantic relations 202 and 203. The words "boat" and "flood" are related by the path comprised of relations 201 and 202.

Semantic relation structures are originally stored in conjunction with the word of the dictionary entry from which the semantic relation structure was constructed. To make all of the semantic relation structures more readily available with respect to all of the words occurring in the semantic relation structures, each semantic relation structure is preferably copied and stored in conjunction with each of the words occurring in the semantic relation structure. Further, each copied semantic relation structure is preferably reoriented so that the word in conjunction with which the copy of the semantic relation structure is stored becomes the head word of the semantic relation structure. This process is described more fully in U.S. patent application Ser. No. 08/227,247 entitled "Method and System for Compiling a Lexical Knowledge Base," which is hereby incorporated by reference.

Figure 3:
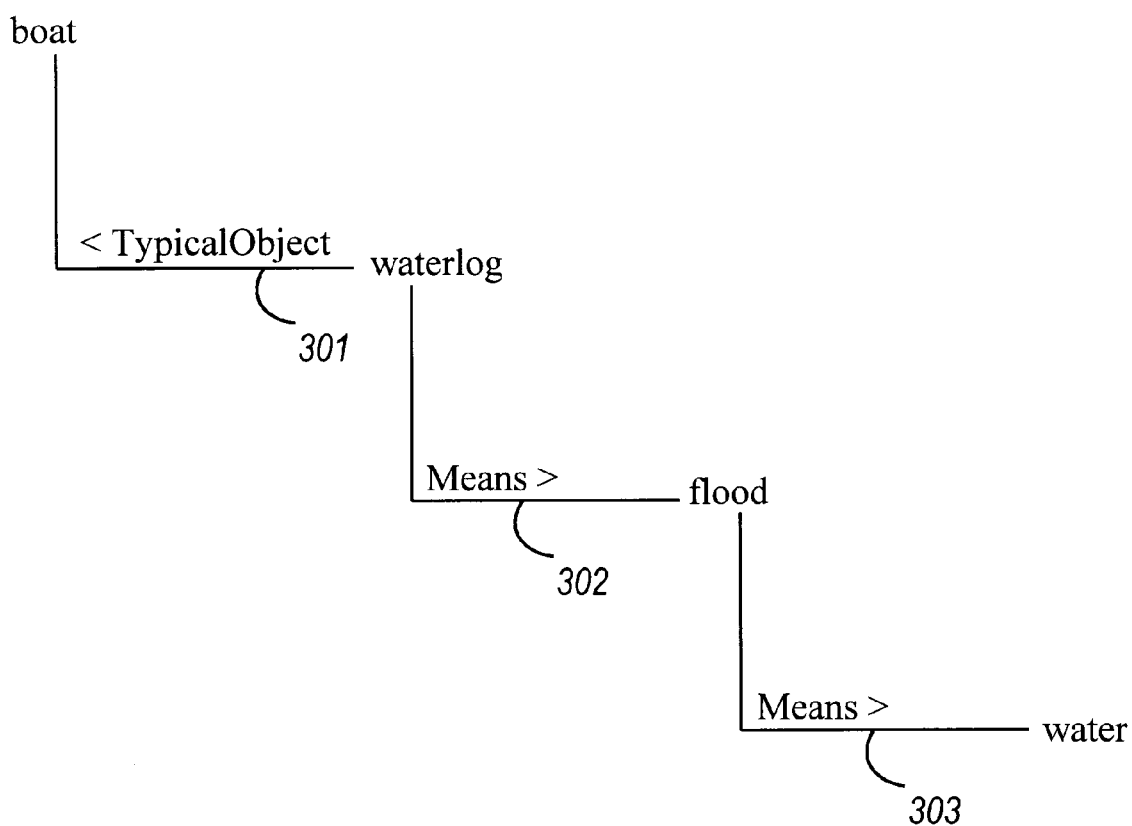
FIG. 3 shows the semantic relation structure of FIG. 2 after being reoriented to place the word "boat" at the head of the semantic relation structure.

FIG. 3 shows the semantic relation structure of FIG. 2 after being reoriented to place the word "boat" at the head of the semantic relation structure. It can be seen from FIG.

3 that semantic relation structures 201, 202, and 203 from FIG. 2 are present in FIG. 3 as semantic relations 301, 302, and 303, but have been reoriented. This form of the semantic relation structure is preferably stored in conjunction with the word "boat," and used to identify paths; between the words "boat" and "water." It can be seen from FIG. 3 that this semantic relation structure contains the following path connecting the words "boat" and "water":

boat←TypicalObject-waterlog-Means→flood-Means→water    (13)

In the description that follows, paths are symbolically generalized in the form $w_1 R_1 w_2 R_2 w_3 \ldots w_n R_n w_{n+1}$, when $w_i$ represents the $i^{th}$ word in the path and $R_i$ represents the $i^{th}$ relation in the path. When path (13) shown above which connects "boat" and "water" is expressed symbolically, the meaning of each symbol is as follows:

| symbol | word or Relation Type |
|---|---|
| $w_1$ | boat |
| $R_1$ | TypicalObjectOf |
| $w_2$ | waterlog |
| $R_2$ | Means |
| $w_3$ | flood |
| $R_3$ | Means |
| $w_4$ | water |

It should be noted that the directionality of each relation type may be indicated by the presence or absence of the word "Of" at the end of the relation type. For example, "TypicalObjectOf" above identifies a backward TypicalObject relation, while "Means" above indicates a forward Means relation.

Figure 4:
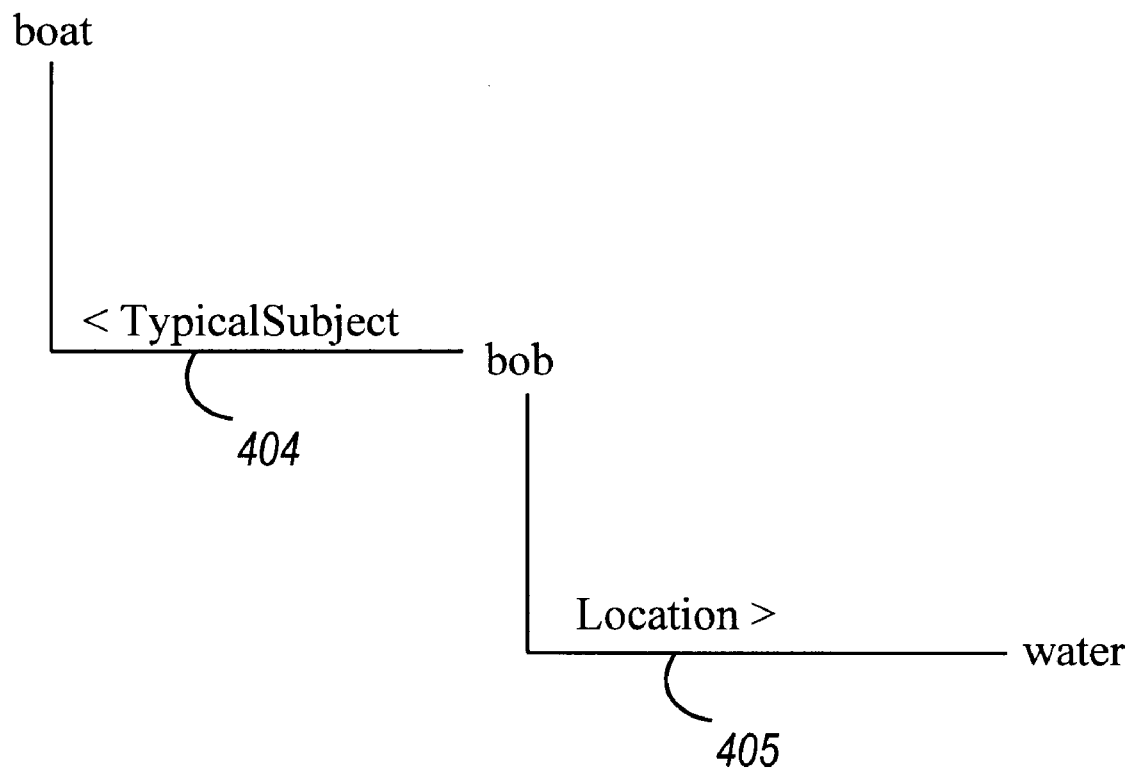
FIG. 4 shows a semantic relation structure that is comprised of semantic relations 404 and 405, and indicating that boats typically bob in the water.

Like FIG. 3, FIGS. 4–6 contain semantic relation structures containing paths between the words "boat" and "water." FIG. 4 shows a semantic relation structure that is comprised of semantic relations 405 and 405, and indicating that boats typically bob in the water. This semantic relation structure contains the following path:

boat←TypicalSubject-bob-Location→water    (14)

Figure 5:
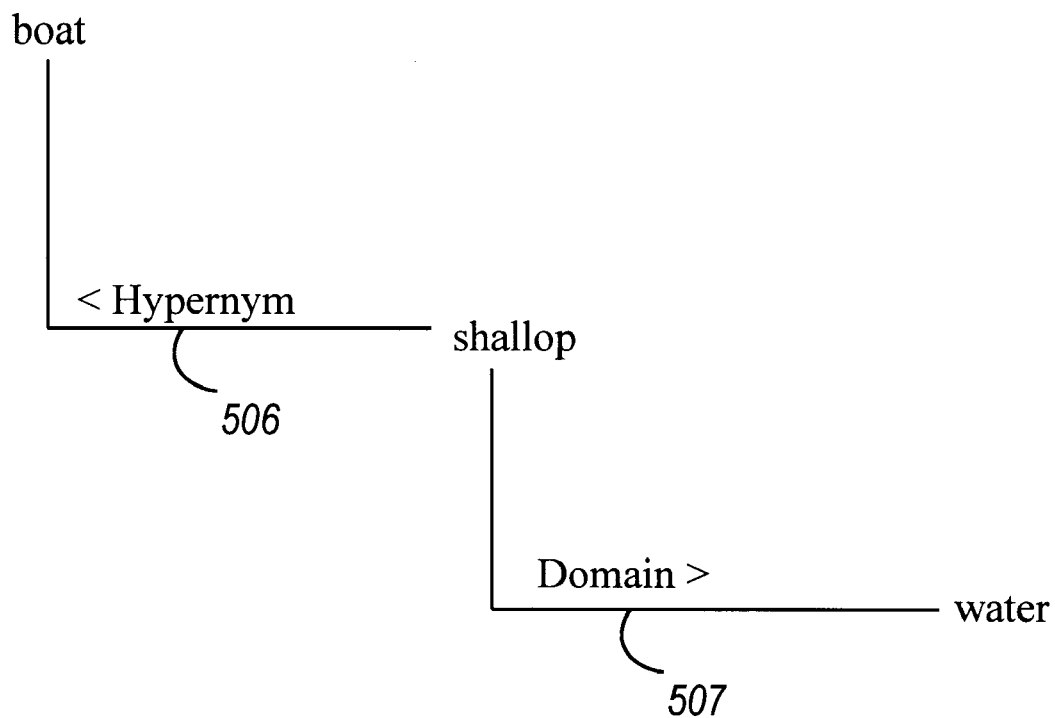
FIG. 5 shows a semantic relation structure indicating that a shallop is a kind of boat that one finds in the water.

FIG. 5 shows a semantic relation structure indicating that a shallop is a kind of boat that one finds in the water. This semantic relation structure is comprised of semantic relations 506 and 507, and contains the following path:

boat←Hypemym-shallop-Domain→water    (15)

Figure 6:
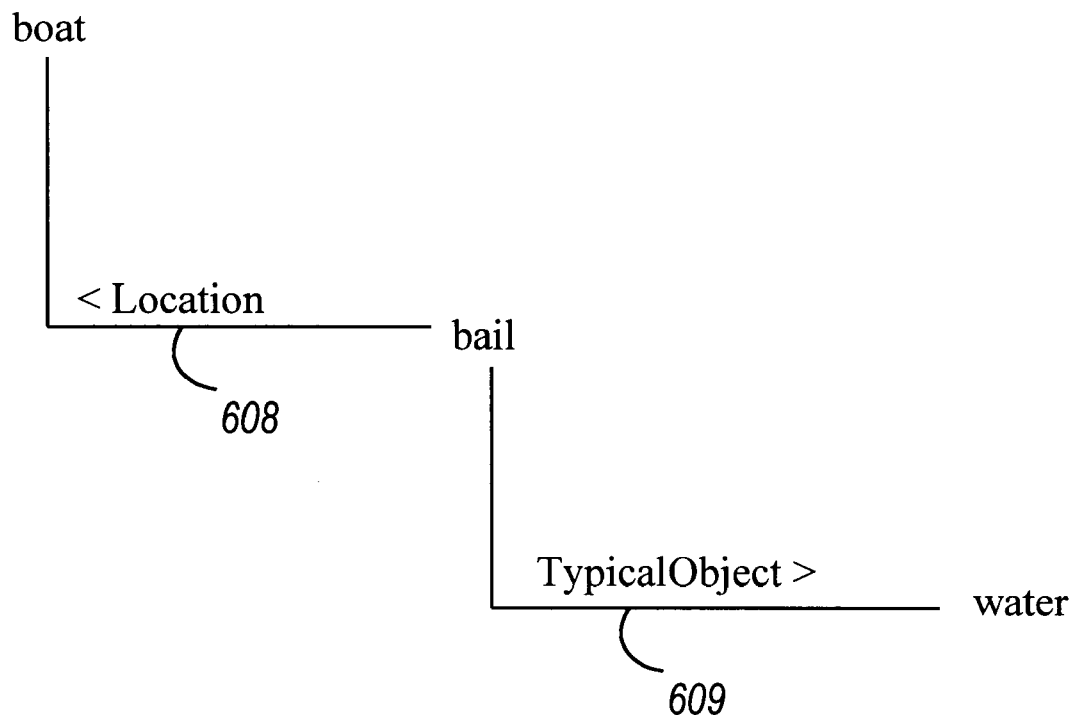
FIG. 6 shows a semantic relation indicating that one bails water in a boat.

FIG. 6 shows a semantic relation indicating that one bails water in a boat. This semantic relation structure is comprised of semantic relations 608 and 609, and contains the following path:

boat←Location-bail-TypicalObject→water    (16)

The semantic relation structures discussed thus far contain complete paths between the words "boat" and "water," and thus directly relate the meaning of these words. Such paths between the source and target word that occur completely within a single semantic relation structure are herein termed "non-extended paths." In contrast, a source word and a target word may also be connected by "extended paths," which are made up of two or more separate subpaths that each occur in a different semantic relation structure. Extended paths, while also providing useful information about relationships in meaning between two words, are nevertheless less reliable than non-extended paths. This is because a "join word" through which two subpaths are joined may, because they occur in different definitions or usage examples, have different senses, and therefore somewhat different meanings.

Figure 7:
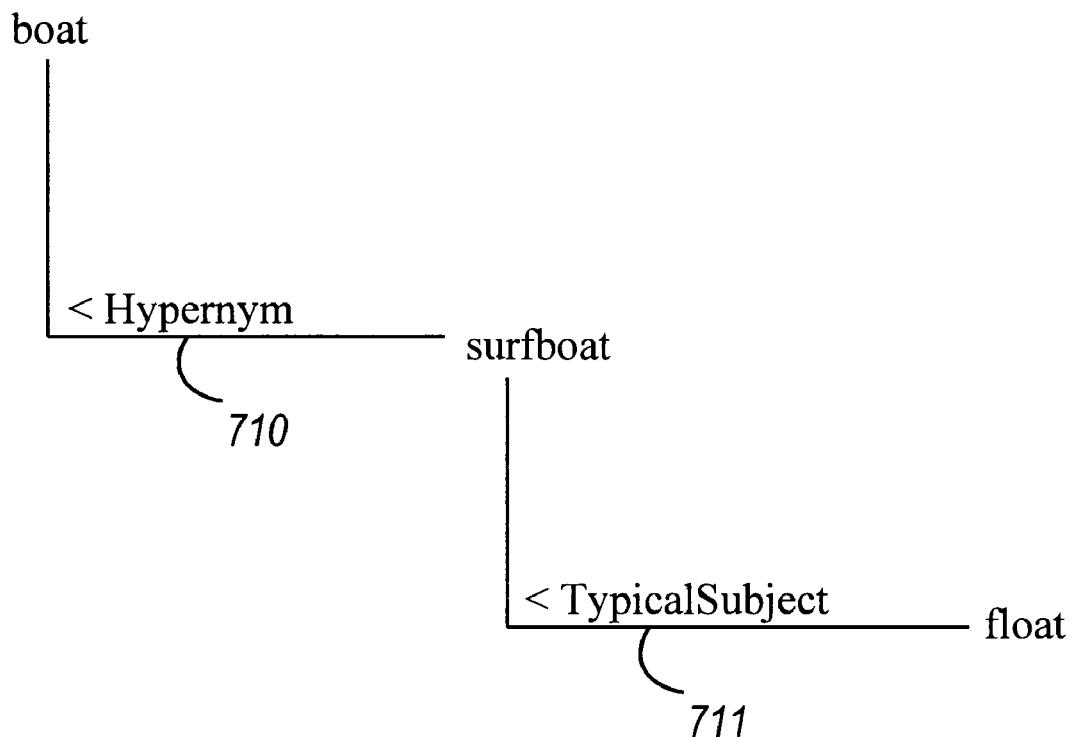
FIG. 7 shows a semantic relation structure containing a path between "boat" and "float."

FIGS. 7–10 show semantic relation structures containing subpaths that may be joined to create extended paths between the words "boat" and "water." Each of these semantic relation structures contains the join word "float," along with either the source or target word. FIG. 7 shows a semantic relation structure containing a path between "boat" and "float." This semantic relation structure indicates that a surfboat is a type of boat that typically floats. The semantic relation structure is comprised of semantic relations 710 and 711, and contains the following paths:

boat←Hypemym-surfboat←TypicalSubject-float    (17)

Figure 8:
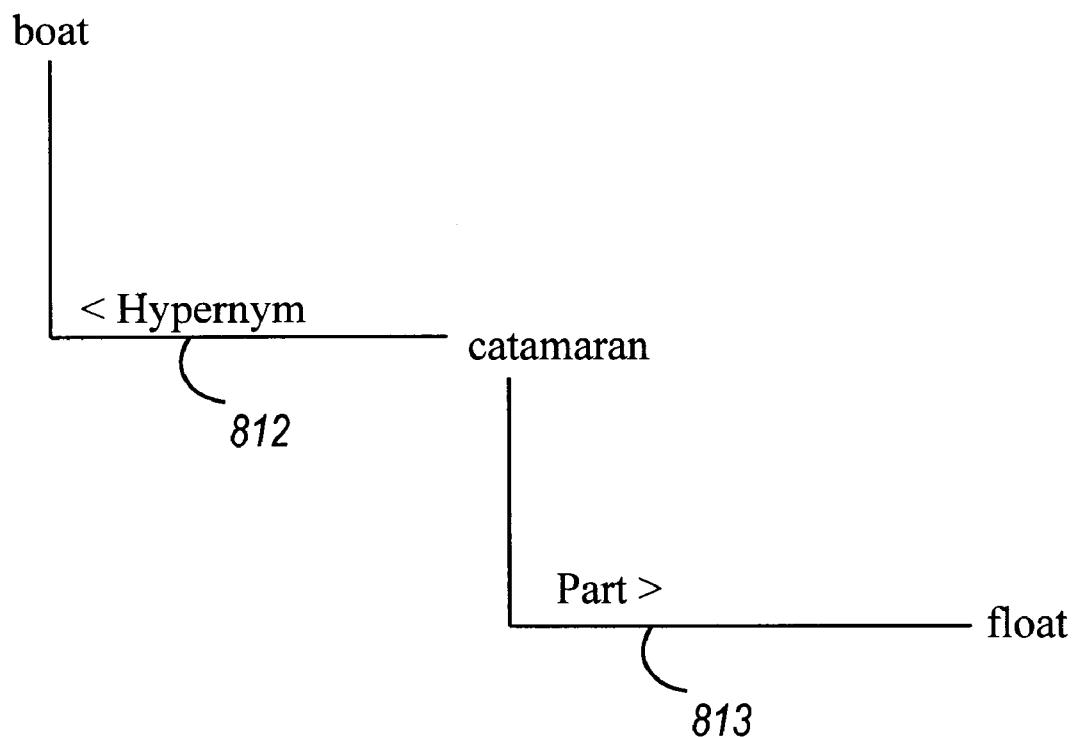
FIG. 8 also shows a semantic relation structure containing a path between "boat" and "float."

FIG. 8 also shows a semantic relation structure containing a path between "boat" and "float." This semantic relation structure indicates that a catamaran is a boat that has a component called a float. The semantic relation structure is comprised of semantic relations 812 and 813, and contains the following path:

boat←Hypernym-catamaran-Part→float    (18)

Figure 9:
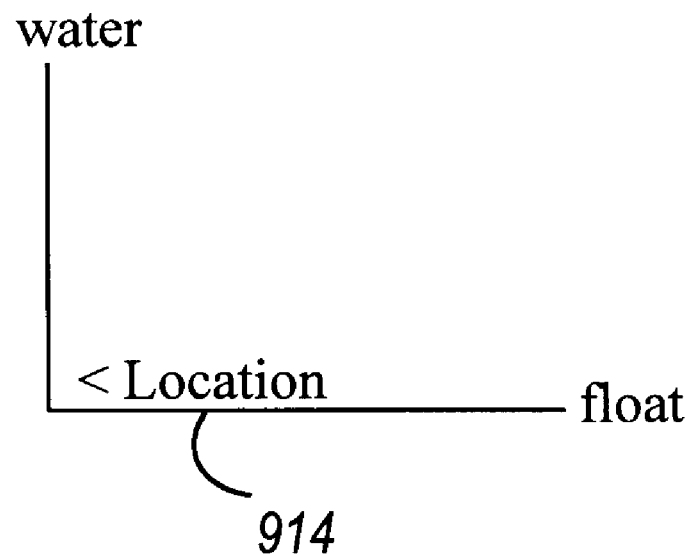
FIG. 9 shows a semantic relation structure indicating that the activity of floating typically occurs in the water.
Figure 10:
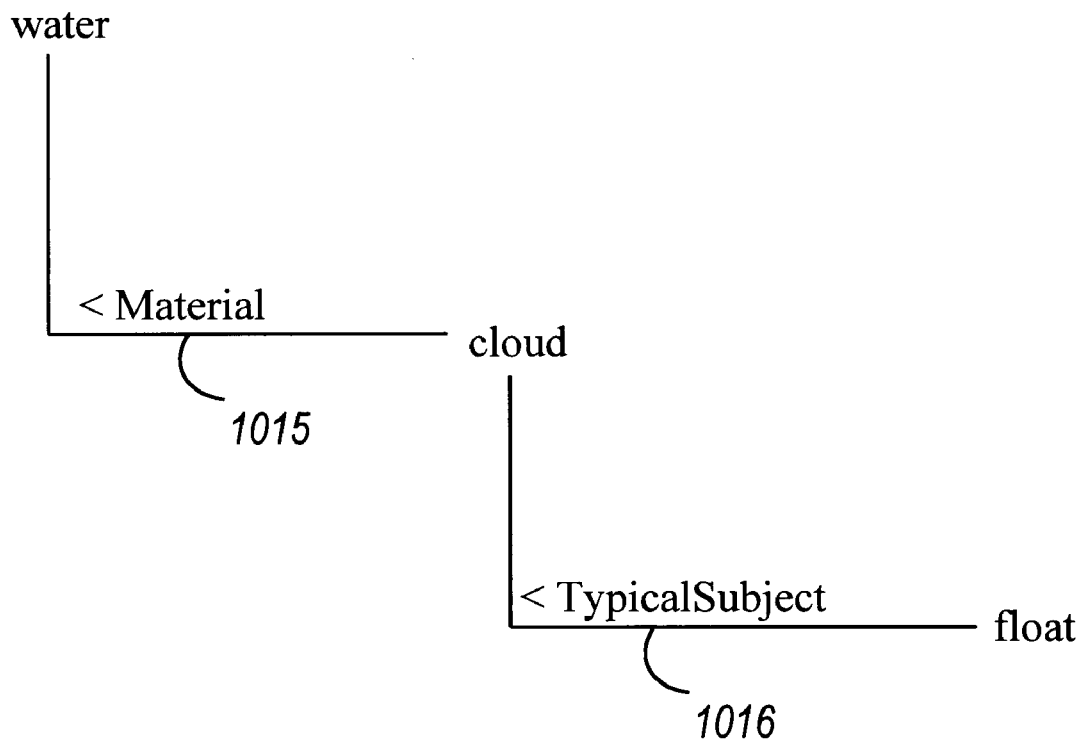
FIG. 10 shows a semantic relation structure indicating that clouds are made up of water and typically float

FIGS. 9 and 10 show semantic relation structures, each containing the words "water" and "float." FIG. 9 shows a semantic relation structure indicating that the activity of floating typically occurs in the water. This semantic relation structure is comprised of semantic relation 914, and contains the following; path:

water←Location-float    (19)

FIG. 10 shows a semantic relation structure indicating that clouds are made up of water and typically float. This semantic relation structure is comprised of semantic relations 1015 and 1016, and contains the following path:

water←Material-cloud←TypicalSubject-float    (20)

By joining the subpaths shown in FIGS. 7–10 in different combinations, four extended paths between "boat" and "water" may be formed:

boat←Hypernym-surfboat←TypicalSubject
  -float-Location →water    (21)

boat←Hypernym-surfboat←TypicalSubject-float-TypicalSubject→
  cloud-Material→water    (22)

boat←Hypernym-catamaran-Part→float-Location→water    (23)

boat←Hypernym-catamaran-Part→float-TypicalSubject→cloud-
  Material→water    (24)

In extended paths (21)–(24), the word "float" is underlined to identify it as the join word. It can be seen that the first two extended paths are completely coherent, in that the verb "float" whose typical subject is "surfboat" is also the verb "float" that takes place in the water (21), and is also the verb "float" whose typical subject is "cloud" (22). Extended paths (23) and (24) are less coherent, however. The noun "float" that is a part of a catamaran differs from the verb float (23), and does not have the typical subject "cloud" (24). The weights assigned to extended paths are therefore adjusted to account for the possibility that the join word is used in a different sense in the two different subpaths in which it occurs.

The facility weights each semantic relation in a semantic relation path based upon its frequency in the lexical knowledge base—that is, the number of times it occurs in the lexical knowledge base. The facility also uses a metric called "frequency-count" to weight semantic relations. A frequency-count indicates for a particular frequency value and a particular relation type the number of different semantic relations of that relation type that have that frequency. For example, if three different semantic relations of the relation type Hypernym have frequencies of 105, then the frequency-count of Hypernym semantic relations at the frequency 105 is three.

Figure 11:
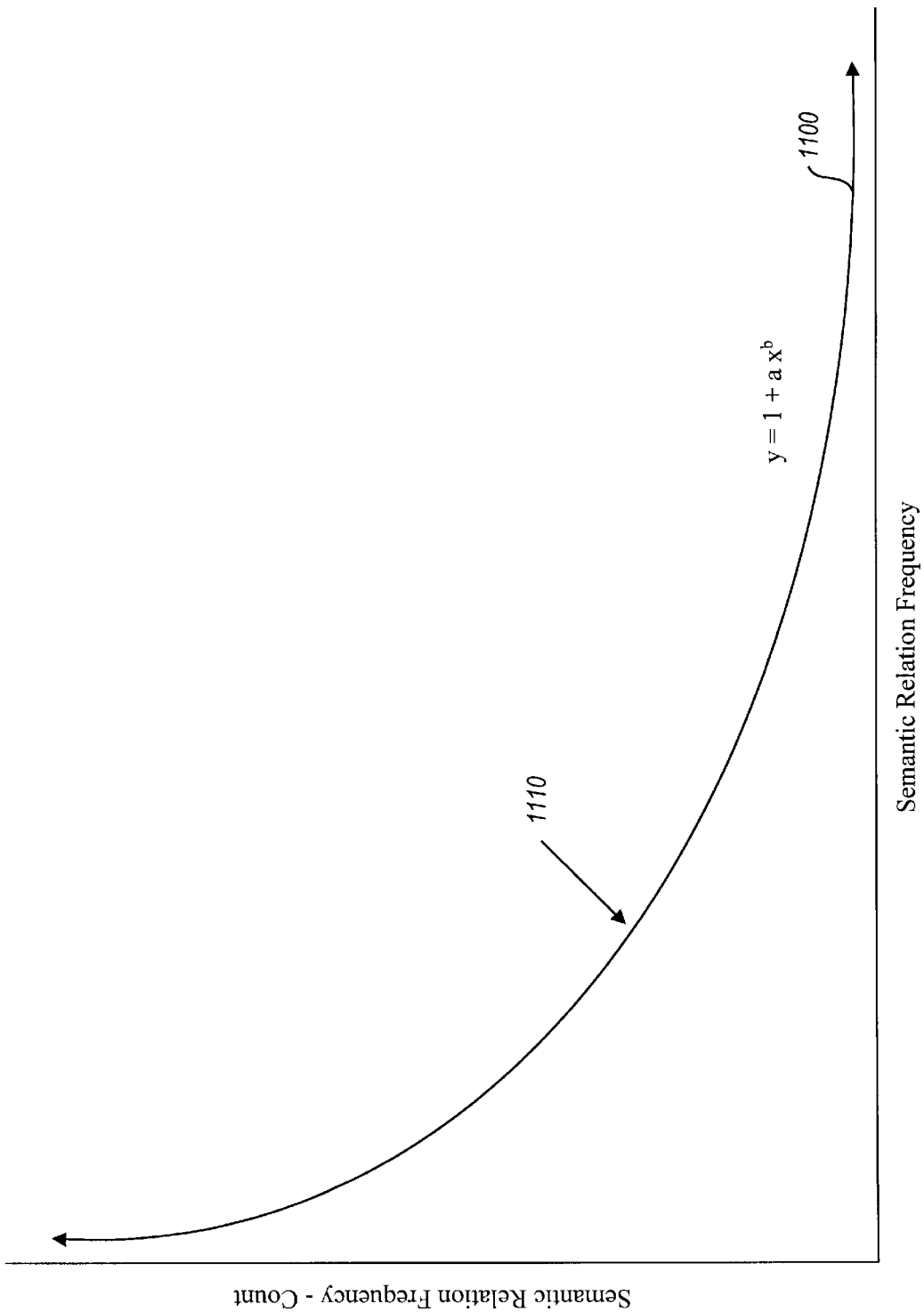
FIG. 11 is a graph showing a power function that approximates the semantic relation frequency-count to semantic relation frequency distribution for semantic relations of a particular relation type.

The curves relating frequency-count to frequency for a particular relation type is consistently hyperbolic—that is, each relation type typically has few different semantic relations with extremely high frequencies and many different semantic relations with extremely low frequencies. FIG. 11 is a graph showing a power function that approximates this hyperbolic semantic relation frequency-count to semantic relation frequency distribution in the corpus for semantic relations of a particular relation type. As this distribution is roughly hyperbolic, it is modeled by a power function 1100, $y=1+ax^b$. A power curve like power curve 1100 is fitted to the frequency-count to frequency distribution for each semantic relation type, using conventional curve-fitting techniques to select values for the "a" and "b" parameters that produce curves that best approximate the frequency-count to frequency distribution for each relation type. As is discussed further below, the facility preferably also fits power curves to the frequency-count to frequency distributions of semantic relation parts as well as those of semantic relation. Each semantic relation $w_iR_iw_{i+1}$ is composed of two semantic relation parts: a first semantic relation part $w_iR_i$ made up of the first word and the relation type, and a second semantic relation part $R_iw_{i+1}$, made up of the relation type and the second word.

Consistent with the hyperbolic nature of the distribution, a large number of semantic relations have a small frequency. As frequency increases, the number of semantic relations having that frequency declines. Vertex 1110 is the point at which the frequency count no longer decreases at a rate greater than that at which the frequency increases, at which the value of the first derivative of the power curve is –1. As mentioned above, this point in the power curve is regarded as identifying semantic relation frequencies of the most salient semantic relations, based on the observation that a salient semantic relationship must be distinctive, and thus not have a extremely high frequency, such as those containing the words "thing" or "use," yet must not be so distinctive that it rarely occurs, and thus not have an extremely low frequency, such as those containing the words "filbert" or "pterodactyl." The facility therefore uses a model for weighting semantic relationships that causes the weight of a semantic relationship to increase as its frequency approaches the vertex from either direction.

Figure 12:
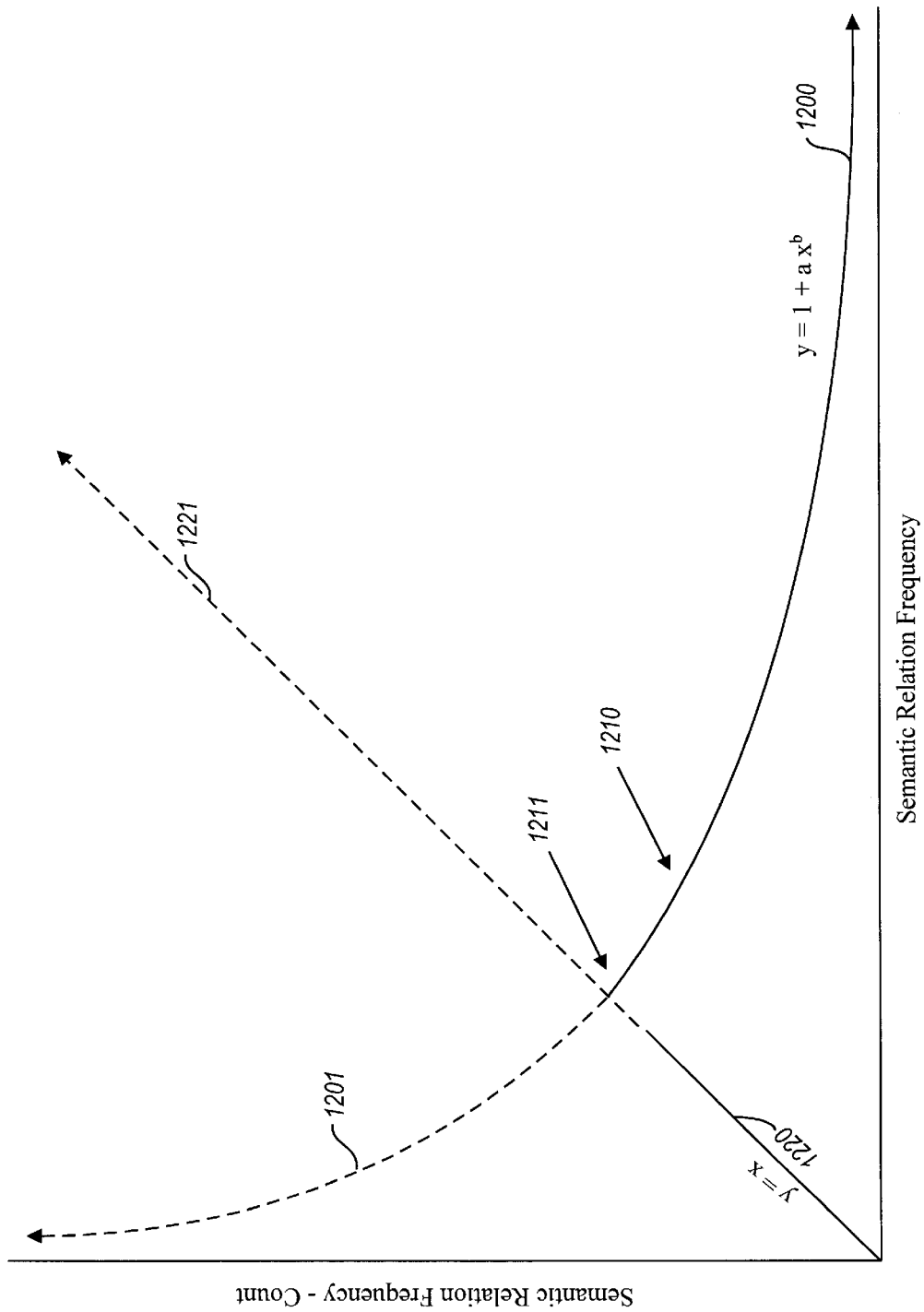
FIG. 12 is a graph showing the calculation of vertex frequency, which is used by the facility to determine the weight of a semantic relation.

FIG. 12 is a graph showing the calculation of vertex frequency, which is used by the facility to determine the weight of a semantic relation. FIG. 12 shows the superimposition of the function "y=x" 1221 over the power function 1200. These functions intersect at an intersection point 1211. Because the intersection point 1211 is usually near the vertex 1210, the facility uses the intersection point as an approximation of the vertex.

The vertex frequency $F_v$ of a particular semantic relation $w_iR_iw_{i+1}$ is defined as the smaller of the frequency of the semantic relation, shown as the function "y=x" 1221, and the value of the power function 1200 at that frequency:

$$F_v(w_iR_iw_{i+1})=\min(F(w_iR_iw_{i+1}), 1+a_{R_{i1}} \cdot F(w_iR_iw_{i+1})^{b_{ri1}}) \qquad <1>$$

$F(w_iR_iw_{i+1})$ is the frequency with which the semantic relation $w_iR_iw_{i+1}$ occurs in the corpus, and is preferably retrieved from the semantic relation frequency table discussed below in conjunction with FIG. 14. $a_{R_{i1}}$, and $b_{R_{i1}}$ are the parameters of the power function fitted to the frequency-count to frequency distribution for whole semantic relations having relation type $R_i$ (The ultimate subscript "1" of the parameters $a_{R_{i1}}$ and $b_{R_{i1}}$ identifies whole semantic relations as opposed to semantic relation parts.), and are preferably retrieved from the power function table discussed below in conjunction with FIG. 15. Thus, for semantic relations whose frequencies are between 0 and the frequency of the intersection point, the vertex frequency $F_v$ is equal to the frequency F. For semantic relations where frequencies are greater than that of the intersection point, the vertex frequency is equal to the value of the power curve.

Figure 13:
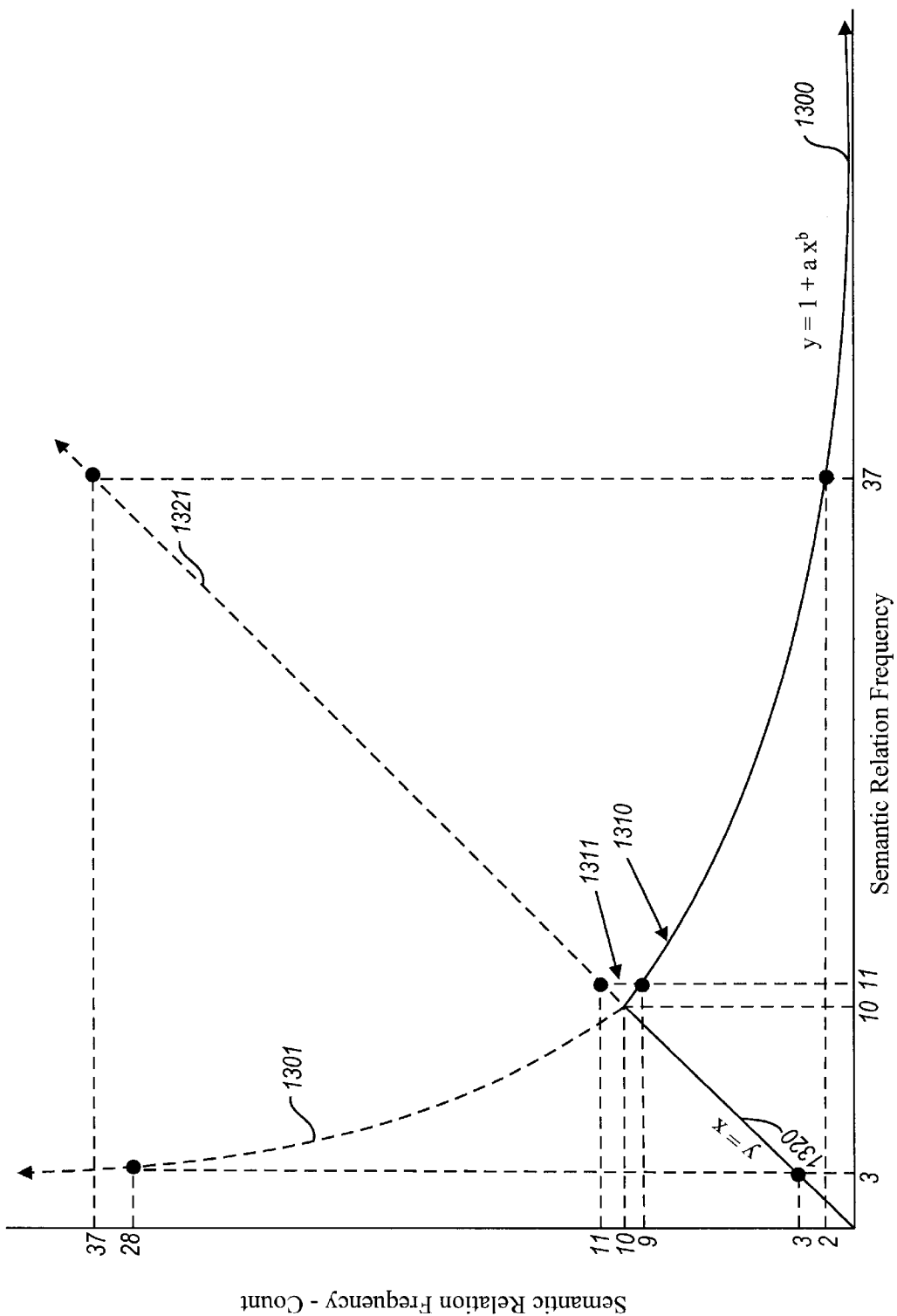
FIG. 13 is a graph showing the calculation of vertex frequency for semantic relations of relation type "TypicalSubject."

FIG. 13 is a graph showing the calculation of vertex frequency for semantic relations of relation type "TypicalSubject." It can be seen from this graph that the intersection point 1311 for semantic relations of the relation type "TypicalSubject" occurs at a frequency value of 10. For frequencies less than ten, the value of a vertex frequency is equal to the frequency value. For example, the semantic relation "float-TypicalSubject→cloud" has the fairly low frequency of 3. In accordance with equation <1>, the vertex frequency for this semantic relation is determined to be the smaller of the frequency, 3, and the value of a power curve at that frequency, 28. The vertex frequency for this semantic relation is therefore 3, which is relatively low. For semantic relations having frequencies larger than the frequency at the intersection point, the vertex frequency is equal to the value of the power curve at that frequency. For example, the frequency of the semantic relation "give-TypicalSubject→people" is 37. In accordance with equation <1>, the vertex frequency of the semantic relation to be the smaller of the frequency, 37, and the value of the power curve at this frequency, 2. The vertex frequency for this semantic relation is therefore 2, which is also relatively low. The semantic relation "boat←Hypernym-surfboat", on the other hand, has the intermediate frequency 11, and a frequency count of 9. Its vertex frequency is therefore 9, which is relatively high. It can therefore be seen that by utilizing a vertex frequency that increases to a point near the vertex, then decreases, the facility gives the greatest weight to those semantic relations having an intermediate frequency, and smaller weights to semantic relations having extremely small or extremely large frequencies.

The vertex frequency Fv shown in equation <1>may be gainfully used to weight individual semantic relations against each other for saliency, but are preferably adjusted by the facility before being combined to weight the saliency of a path comprised of the semantic relations. These adjusted vertex frequencies, called vertex probabilities, may in turn be combined in order to obtain a weight for the entire path. For example, the weight of path (17) above may be obtained by combining the vertex probabilities of its two constituent semantic relations (25) and (26):

boat←Hypernym-surfboat (25)

surfboat←TypicalSubject-float (26)

As can be seen from equation <2>, the vertex probability for a semantic relation is obtained by dividing the vertex frequency for the semantic relation by the total number of semantic relations occurring in the corpus. (The total number of semantic relations occurring in the corpus is shown as the sum of the frequencies of semantic relations having all first words, relation types, and second words.)

$$P_v(w_i R_i w_{i+1}) = \frac{F_v(w_i R_i w_{i+1})}{\sum_{\text{all } j,k,l} F(w_j R_k w_l)} \quad \langle 2 \rangle$$

For example, $P_v$ for semantic relation (25) is determined by dividing the vertex frequency for semantic relation (25) by the total number of semantic relations occurring in the corpus. The formula for vertex probability shown in (equation <2>characterizes the saliency of the semantic relation $w_i R_i w_{i+1}$ in isolation, rather than in connection with any other semantic relations. However, when a semantic relation occurs in a path after another semantic relation as semantic relation (26) does in path (17), its vertex probability must be conditioned on the occurrence of its initial word in the preceding semantic relation. The vertex probability of semantic relations other than the first relation in a path is therefore obtained using equation <3w> below, in which the denominator of equation <2>, the total number of semantic relations occurring in the corpus, is replaced with the number of occurrences in the corpus of semantic relations beginning with the word $w_i$:

$$P_v(w_i R_i w_{i+1} \mid w_i) = \frac{F_v(w_i R_i w_{i+1})}{\sum_{\text{all } l,m} F(w_i R_l w_m)} \quad \langle 3 \rangle$$

For example, $P_v$ for semantic relation (26) is determined by dividing the vertex frequency for semantic relation (26) by the total number of semantic relations starting with "surfboat."

While the vertex probability for a semantic relation can provide a useful assessment of saliency for semantic relations having an intermediate or high frequency, it does not provide an inherently reliable assessment of the saliency of relations having extremely low frequencies. This is because a semantic relation having an extremely low frequency may indicate either that (A) the semantic relation has a low level of saliency or that (B) the corpus upon which the lexical knowledge base is based is of insufficient sample size with respect to the semantic relation. Because the significance of a low vertex probability for a semantic relation having an extremely low frequency is ambiguous, vertex probability alone is an unreliable assessment of the saliency of such semantic relations. Such semantic relations can be more accurately weighted using a combination of the vertex probabilities of their semantic relation parts. The vertex probability for a first semantic relation part, such as the first semantic relation part "surfboat←TypicalSubject-" of semantic relation (26), is given by equation <4>, and the vertex probability of a second relation part conditioned on its relation type, such as the second semantic relation part "←TypicalSubject-float" of semantic relation (26) conditioned on the relation type "TypicalSubject," is given in equation <5>:

$$P_v(w_i R_i) = \frac{F_v(w_i R_i)}{\sum_{\text{all } j,k} F(w_j R_k)} \quad \langle 4 \rangle$$

$$P_v(R_i w_{i+1} \mid R_i) = \frac{F_v(R_i w_{i+1})}{\sum_{\text{all } l} F(R_i w_l)} \quad \langle 5 \rangle$$

It can be seen from equation <4> that the vertex probability for a first semantic relation part is obtained by dividing the vertex frequency of the first semantic relation part by the total number of first semantic relation parts in the corpus. As can be seen from equation <6> below, the vertex frequency for the first semantic relation part is calculated in the same way as the vertex frequency of a semantic relation, using the power curve obtained for first semantic relation parts having the present relation type (here TypicalSubject), represented by the parameters $a_{R_{i2}}$ and $b_{R_{i2}}$. (The ultimate subscript "2" of the parameters $a_{R_{i2}}$ and $b_{R_{i2}}$ identifies first semantic relation parts as opposed to whole semantic relations and second semantic relation parts.)

$$F_v(w_i R_i) = \min(F(w_i R_i), 1 + a_{R_{i2}} \cdot F(w_i R_i)^{b_{R_{i2}}}) \quad \langle 6 \rangle$$

As can be seen from equation <5>, the vertex probability for the second relation part conditioned on the relation type is obtained by dividing the vertex frequency for the second semantic relation part by the total number of second semantic relation parts having the present relation type. Like the vertex frequency of the first semantic relation part, equation <7> shows that the vertex frequency of the second semantic relation part is obtained in a similar manner to the vertex frequency of an entire semantic relation, this time using the power curve obtained for second semantic relation parts having the present relation type (here TypicalSubject), represented by the parameters $a_{R_{i3}}$ and $b_{R_{i3}}$. (The ultimate subscript "3" of the parameters $a_{R_{i3}}$ and $b_{R_{i3}}$ identifies second semantic relation parts as opposed to whole semantic relations and first semantic relation parts.)

$$F_v(R_i w_{i+1}) = \min(F(w_i R_i), 1 + a_{R_{i3}} \cdot F(R_i W_{i+1})^{b_{R_{i3}}}) \quad \langle 7 \rangle$$

The product of the first semantic relation part and second semantic relation part vertex probabilities may be substituted for the vertex probability of semantic relations having extremely small frequencies. Alternatively, as discussed farther below, these two measures of a semantic relation's saliency may be combined in a weighted average that favors the vertex probability of the semantic relation parts for semantic relations having small frequencies, and which favors the vertex probability of a:i entire semantic relation for semantic relations having a higher frequency.

FIG. 14 is a data structure diagram showing a semantic relation frequency table. The semantic relation frequency table 1400 is compiled by the facility in order to track the frequencies of each semantic relation encountered in the corpus. Each row relates to a singly unique semantic relation occurring, in the corpus. Columns 1401, 1402, and 1403 identify the unique semantic relation by containing the first word, relation type, and second word, respectively, of the unique semantic relation. For each unique semantic relation, the frequency column 1404 contains the number of times the semantic relation occurs in the corpus. For example, it can be seen from row 1412 of the semantic relation frequency table that the semantic relation "float-TypicalSubject→boat" occurs in the corpus 11 times.

FIG. 15 is a data structure diagram showing a power function table. Each row of the power function table 1500 contains a representation of a power function fitted to the frequency count to frequency distribution for each relation type, for the semantic relations having the relation type, semantic relation first parts having the relation type, and semantic relation second parts having the relation type. Relation type column 1501 contains the relation type. The next column 1502 contains an indication of whether each row contains information about the power function fitted to a semantic relation, a semantic relation first part, or a semantic relation second part. Columns 1503 and 1504 contain the "a" and "b" parameters defining the power function fitted to the semantic relation, semantic relation first part, or semantic relation second part to which the row corresponds. For example, it can be seen from the power function table that the "a" and "b" parameters defining the power function for semantic relations having relation type "TypicalObject" are 2097 and −2.28, respectively, indicating that the distribution of frequency-count to frequency is approximated by the power function "$y = 1 + 2079 x^{-2.28}$".

Figure 16:
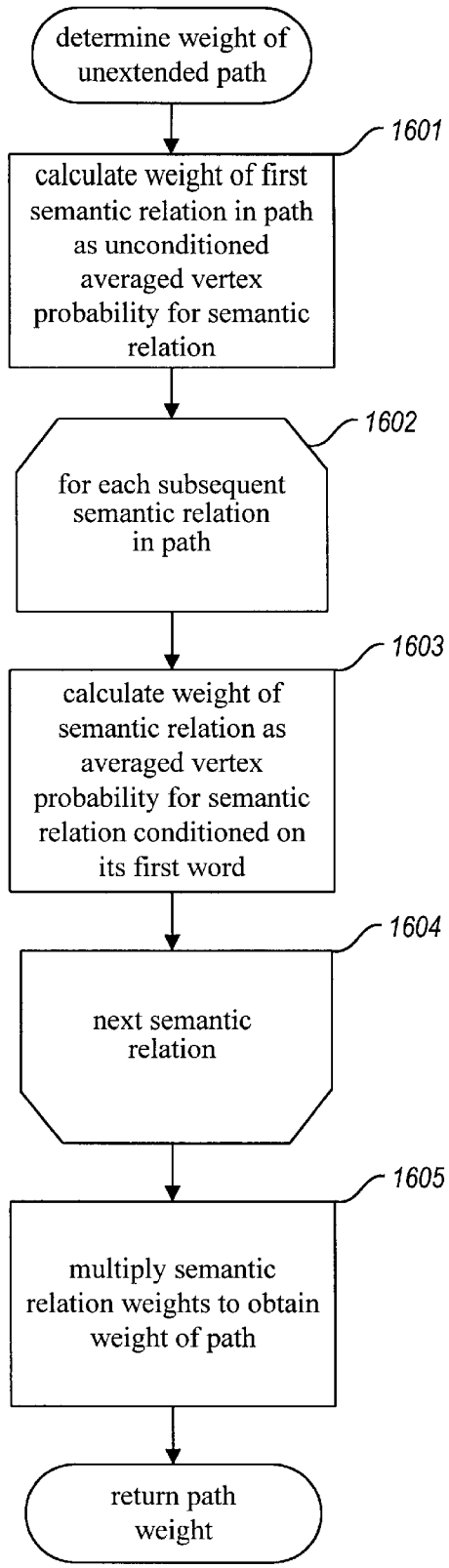
FIG. 16 is a flow diagram showing the step preferably performed by the facility in order to determine the weight of an unextended path occurring within a single semantic relation structure.

FIG. 16 is a flow diagram showing the steps preferably performed by the facility in order to determine the weight of an unextended path occurring within a single semantic relation structure. In step 1601, the facility calculates the weight of the first semantic relation in the path as the unconditioned averaged probability $\overline{P_v}$ for the semantic relation, using equation <8>:

$$\overline{P_v}(w_i R_i w_{i+1}) = A(w_i R_i w_{i+1}) \cdot P_v(w_i R_i w_{i+1}) + A'(w_i R_i w_{i+1}) \cdot P_v(w_i R_i) \cdot P_v(R_i w_{i+1} | R_i) \quad <8>$$

The averaged vertex probability $\overline{P_v}$ combines a vertex probability of the semantic relation $P_v(w_i R_i w_{i+1})$ weighted against the vertex probabilities of the semantic relation parts, $P_v(w_i R_i)$ and $P_v(R_i w_{i+1} | R_i)$. For example, for semantic relation (25), the facility weighs the vertex probability of semantic relation (25) against the vertex probabilities of its first and second parts based on the frequency of semantic relation (25). The average weighting factors A and A' are based on the frequency F of the semantic relation:

$$A(w_i R_i w_{i+1}) = \frac{F(w_i R_i w_{i+1})}{F(w_i R_i w_{i+1}) + 1} \quad \langle 9 \rangle$$

$$A'(w_i R_i w_{i+1}) = \frac{1}{F(w_i R_i w_{i+1}) + 1} \quad \langle 10 \rangle$$

When the semantic relation frequency is small, A and A' have similar values, thereby weighting the semantic relation vertex frequency and the semantic relation part vertex frequencies at a similar level. As the frequency of the semantic relation increases, A becomes much larger than A', causing the vertex frequency of the semantic relation to be weighted at a much higher level than the vertex frequency of the semantic relation parts. For semantic relation (25), because its frequency is 3, A is 0.75 and A' is 0.25, causing the vertex probability of the entire semantic relation to be weighted at three times the level at which the individual semantic relation part vertex probabilities are weighted. As shown above in equation <2>, the vertex probability of the semantic relation, $P_v(w_i R_i w_{i+1})$, is the vertex frequency of the semantic relation divided by the number of occurrences of all semantic relations. As is further shown in equation <4>, the vertex probability of the first semantic relation part, $P_v(w_i R_i)$, is the vertex frequency of the first semantic relation part divided by the total number of occurrences of first semantic relation parts. As is further shown above in equation <5>, the vertex probability of the second semantic relation part conditioned on the occurrence of the relation type, $P_v(w_i R_i w_{i+1} | R_i)$, is the vertex frequency of the second semantic relation part divided by the number of semantic relations having the same relation type. Finally, the vertex frequencies of the semantic relation $F_v(w_i R_i w_{i+1})$, for the first semantic relation part $F_v(w_i R_i)$, and the second semantic relation part $F_v(R_i w_{i+1})$ as shown above in equations <1>, <6>, and <7> are each the smaller of the frequency of the semantic relation or semantic relation parts and the value of the power curve for the same relation type at that frequency.

Steps 1602–1604 contain a loop that iterates through each subsequent semantic relation in the path. In each iteration of the loop, in step 1603, the facility calculates the weight of the current semantic relation as the averaged vertex probability for that semantic relation, conditioned on its first word, as shown in equation <11>:

$$\overline{P_v}(w_i R_i w_{i+1} | w_i) = A(w_i R_i w_{i+1}) \cdot P_v(w_i R_i w_{i+1} | w_i) + A'(w_i R_i w_{i+1}) \cdot P_v(w_i R_i | w_i) \cdot P_v(R_i w_{i+1} | R_i) \quad <11>$$

Equation <11> contains a term not yet defined: the vertex probability of a first semantic relation part conditioned on the word of a first semantic relation part, $P_v(w_i R_i | w_i)$. This vertex probability is calculated as shown in equation <12>.

$$P_v(w_i R_i | w_i) = \frac{F_v(w_i R_i)}{\sum_{\text{all } k} F(w_i R_k)} \quad \langle 12 \rangle$$

After the facility has calculated a weight for each semantic relation in the path, the facility continues in step 1605. In step 1605, the facility multiplies the semantic relation weights calculated in steps 1601 and 1603 to obtain the weight of the path $\overline{P_v}$ as shown in equation <13>:

$$\overline{P_v}(w_1 R_1 w_2 R_2 w_3 \ldots w_n R_n w_{n+1}) = \overline{P_v}(w_1 R_1 w_2) \cdot \overline{P_v}(w_2 R_2 w_3 | w_2) \cdot \ldots \cdot \overline{P_v}(w_n R_n w_{n+1} | w_n) \quad <13>$$

This path weight is then returned. For semantic path (7), this would involve determining $\overline{P_v}$ for semantic relation (25) using equation <8>, determining $\overline{P_v}$ for semantic relation (26) using equation <11>, and multiplying them together.

The facility is preferably operable in two different modes. In a first mode, the steps of FIG. 16 are used to calculate the weight of non-extended subpaths as needed in order to identify salient paths in accordance with FIG. 18, discussed below. In a second mode, before identifying any salient paths, the facility exhaustively precomputes the weight of every non-extended path from the head word in each relation structure to each other word in the relation structure. The weights are then stored, preferably in conjunction with each other word in the relation structure, for use by the facility to identify salient paths. These stored weights are especially useful for identifying salient extended paths. For example, with reference to the semantic relation structure shown in FIG. 3, the weight of the path between "boat" and "waterlog" is preferably stored in conjunction with "waterlog," the weight c,f the path between "boat" and "flood" is preferably stored in conjunction with "flood," etc. The second mode has the advantage of reducing the processing required to identify the salient paths between a pair of words, at the expense of significant up-front processing requirements for performing the precomputation.

Figure 17:
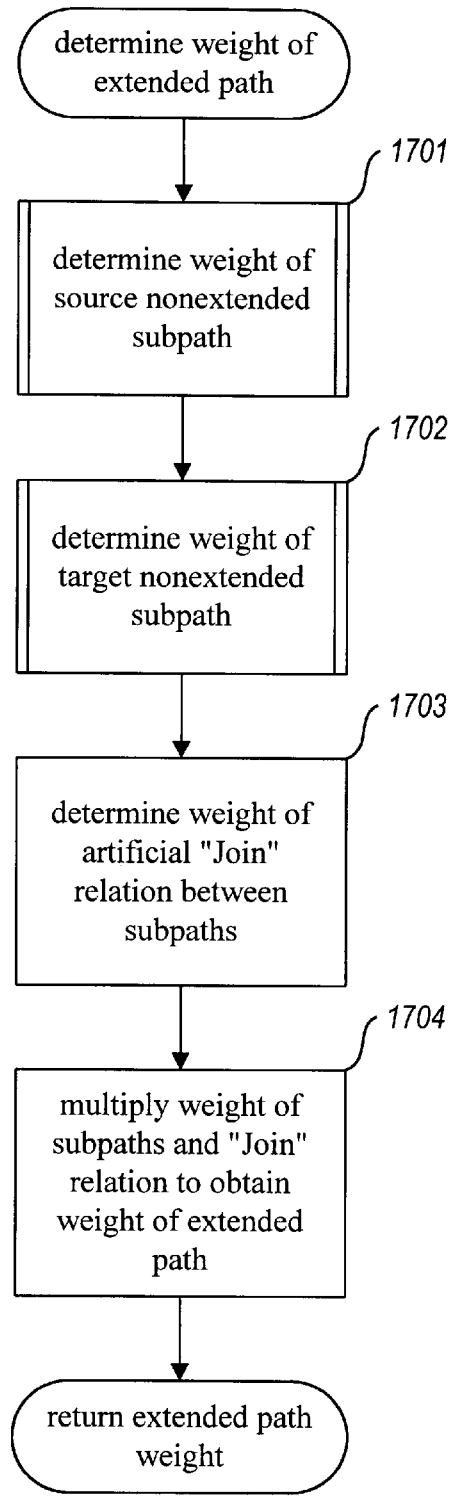
FIG. 17 is a flow diagram showing the step preferably performed by the facility in order to determine the weight of an extended path comprised of two nonextended subpaths.

FIG. 17 is a flow diagram showing the steps; preferably performed by the facility in order to determine the weight of an extended path comprised of two non-extended subpaths.

These steps may be applied to determine the weight of extended path (21), made up of subpaths (17) and (19), in which "boat" is the source word, "water" is the target word, and "float" is the intersection, or "join" word. The source subpath connects the source word to an intersection word. The target subpath connects the intersection word to the target word. In step 1701, tie facility determines the weight of the source subpath using the steps shown in FIG. 16. In step 1702, the facility determines the weight of the target subpath by again performing the steps shown in FIG. 16. In step 1703, the facility determines the weight of an artificial "Join" relation between the two subpaths to be the multiplicative inverse of the total number of occurrences of semantic relations containing word $w_{i+1}$ as shown in equation <14>:

$$P_v(w_{i+1}Jw_{i+1} \mid w_{i+1}) = \frac{1}{\sum_{\text{all } j,k} F(w_{i+1}R_jw_k)} \quad \langle 14 \rangle$$

The weight of the "Join" relation reflects the likely degree to which the meaning of the intersection word is the same in the different semantic relation structures containing the source and target subpaths. For example, for extended path (21), the weight of the Join relation is the multiplicative inverse of the total number of occurrences of semantic relations containing the word "float."

Where sense characterizations are available in the lexical knowledge base that identify the particular sense of word $w_{i+1}$ in the different semantic relation structures containing the source and target subpaths, the facility preferably instead determines the weight of the "Join" relation based upon the level of similarity between the meanings of the two senses of word $w_{i+1}$. The production of a lexical knowledge base providing such sense characterizations is described in detail in U.S. patent application No. (Patent Counsel's Docket No. 661005.546) entitled "BOOTSTRAPPING SENSE CHARACTERIZATIONS OF POLYSEMOUS WORDS," which is hereby incorporated by reference. The use of a lexical knowledge base providing sense characterizations to assess the level of similarity between two senses of a polysemous word is described in detail in U.S. Pat. No. 08/904,223 (Patent Counsel's Docket No. 661005.524) entitled "DETERMINING SIMILARITY BETWEEN WORDS," which is hereby incorporated by reference. This assessment of similarity is preferably normalized relative to the weight of actual relations in order to determine the weight of the "Join" relation.

In step 1704, the facility multiplies the weights of the subpaths determined in steps 1701 and 1702 with the weight of the "Join" relation determined in step 1703 to obtain the weight of the extended path as shown in equation <15>:

$$\overline{P_v}(w_1R_1w_2 \ldots w_iR_iw_{i+1} \ldots w_nR_nw_{n+1}) = \overline{P_v}(w_1R_1w_2 \ldots w_iR_iw_{i+1}) \cdot$$
$$P_v(w_{i+1}Jw_{i+1}|w_{i+1}) \cdot \overline{P_v}(w_{i+1}R_{i+1}w_{i+2} \ldots w_nR_nw_{n+1}|w_{i+1}) \quad \langle 15 \rangle$$

When operating in the second mode, the facility preferably also stores in conjunction with each word in each relation structure other than the head word a second value, equal to the product of the second and third terms of equation <15>, so that an extended path weight may be calculated by merely multiplying the first value stored for the join word in the source relation structure (e.g., the word "float" in the relation structure shown in FIG. 7) and the second value stored for the join word in the target relation structure (e.g., the word "float" in the relation structure shown in FIG. 9). These steps then return the extended path weight.

Figure 18:
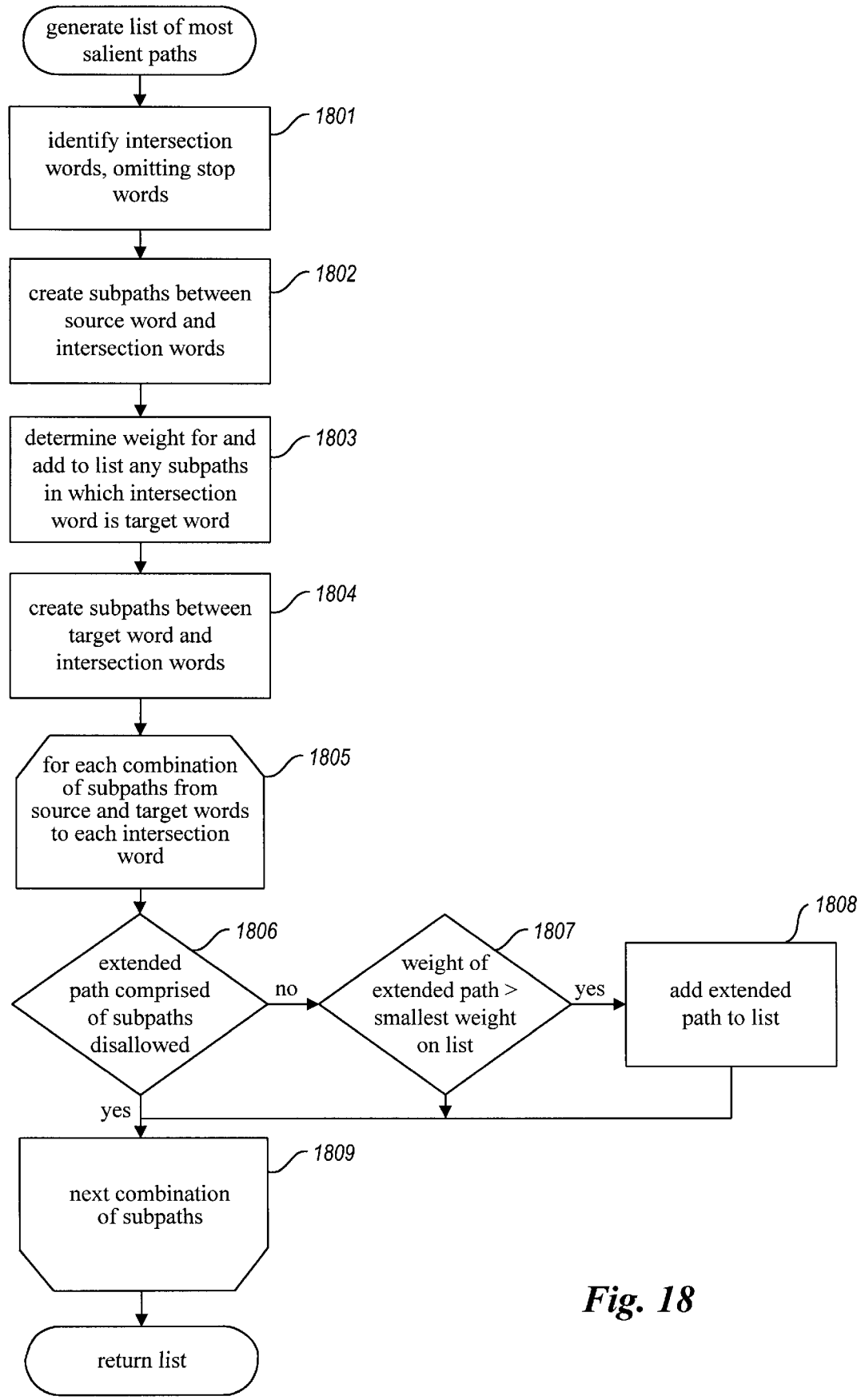
FIG. 18 is a flow diagram showing the steps preferably performed by the facility in order to generate a list of the most salient paths between a source word and a target word.

FIG. 18 is a flow diagram showing the step preferably performed by the facility in order to generate a list of the most salient paths between a source word and a target word. These steps maintain, through their consideration of various possible paths, a list of a fixed number of the considered paths having the largest weights. In step 1801, the facility identifies intersection words occurring both in the semantic relation structures connected to the source word and the semantic relation structures connected to the target word. In doing so, the facility omits intersection words that are included in a list of "stop words." These stop words are words that occur extremely frequently, and therefore have little meaning, such as: "thing," make," "give," "use," "do," "put," "take," and "have." In the example, the facility identifies as intersection words both "float" and the target word, "water."

In step 1802, the facility creates subpaths in the, semantic relation data structures connected to the source word between the source word and each intersection word identified in step 1801. In the example the facility creates subpaths between "boat" and "water," shown above as paths (13)–(16), and creates subpaths between "boat" and "float," shown above as paths (17) and (18).

In step 1803, the facility determines the weight for each subpath created in step 1802 in which the intersection word is the same as the target word, i.e., for those subpaths that connect the source word and the target word. In the example, the facility determines the weights of paths (13)–(16). As mentioned above, in different embodiments, the facility either precalculates path weights for the paths in every relation structure, in which case the facility merely retrieves these precalculated weights in step 1803, or else calculates weights only when needed, in which case the facility calculates the weights of these paths in step 1803 using equation <13> and the steps of FIG. 16. The facility further adds these paths to the list of the most salient paths between the source word and the target word. The list preferably has a limited number of entries, and is sorted by the weights of the paths. To add a path to the list, the path is inserted at a point such that the weights for paths remain sorted. If the list already contains the maximum number of paths and the weight of the new path is smaller than the smallest weight of a path already on the list, the new path is not added to the list. If the list contains the maximum number of paths and the weight of the new path is greater than the smallest weight of a path on the list, then the new path is inserted at the appropriate point and the path having the smallest weight is removed from the list.

In step 1804, the facility creates subpaths between the target word and the identified intersection words in the semantic relation structures attached to the target word. In the example, the facility creates subpaths between "water" and "float" as shown above as paths (19) and (20).

In steps 1805–1809, the facility loops through each combination of subpaths to each identified intersection word from the source and target words. In step 1806, if the extended path comprised of the present combination of subpaths is disallowed by a constraint of the facility, then the facility continues in step 1809 to iterate to the next combination of subpaths, else the facility continues in step 1806. Extended paths disallowed by the facility are those that arc already present on the list, and those that contain more than one occurrence of either tile source or target words. If the extended path is disallowed, it is not considered for addition to the list. However, if the extended path is not disallowed, in step 1807, if the weight of the extended path is greater than the smallest weight on the list, then the facility continues in step 1808, else the facility continues in step 1809. In step 1807, the facility determines the weight of the extended path using equation <15> and the steps of FIG. 17. In step 1808, the extended path is added to the list in the same manner discussed above in conjunction with step 1803 to maintain the fixed size of the list. In step 1809, the facility iterates to he next combination of subpaths. After each combination of subpaths has been processed, the steps return the list of most salient paths in its present form.

While this invention has been shown and described with reference to preferred embodiments, it will be understood by those skilled in the art that various changes or modifications in form and detail may be made without departing from the scope of the invention. For example, the semantic relation structures may be derived from corpora other than dictionaries. Also, instead of producing a list of a fixed number of the most salient paths, between two words, the facility may be straightforwardly adapted to produce a list of all of the paths whose weight exceeds a minimum threshold. Further, rather than creating the data structure specifying a path when the path is placed on the list of paths with the largest weights, the facility may wait until it has been determined which paths will be on the list, according to their weights, before creating data structures for those paths, thus avoiding the cost of creating data structures specifying paths of intermediate weight that are added to the list, then later removed from the list.

I claim:

1. A method in a computer system for identifying and evaluating the saliency of semantic relation paths between a pair of words using a dictionary that contains word entries each for a word, the word entries in turn containing segments of natural language that characterize the word of the word entry, the method comprising the steps of:

for each of the natural language segments of the word entries, constructing a semantic relation structure comprised of semantic relations occurring between words in the natural language segment, each semantic relation having a relation type and relating two of the words in the natural language segment;

for each relation type:
  determining the number of occurrences in the constructed semantic relation structures of each unique semantic relation having the relation type, called frequency,
  determining, for each frequency, the number of unique semantic relations having that frequency, called frequency-count, and
  generating a power curve approximating the distribution of frequency-count over frequency for the relation type;

for at least one word of the pair, collecting the semantic relation structures that relate the word of the pair to other words;

selecting, among the collected semantic relation structures, paths within the collected semantic relation structures that connect the words of the pair; and for each selected path between the words of the pair, determining a measure of the saliency of the path by:
  for the first semantic relation in the path, determining a semantic relation weight by dividing (the smaller of the frequency of the semantic relation and of the value of the power curve for the relation type of the semantic relation at the frequency of the semantic relation) by (the total number of constructed semantic relations),
  for subsequent semantic relations in the path, determining a semantic relation weight by dividing (the smaller of the frequency of the semantic relation and the value of the power curve for the relation type of the semantic relation at the frequency of the semantic relation) by (the total number of constructed semantic relations beginning with the same word as the semantic relation, and
  multiplying the weight determined for each semantic relation in the path to obtain a measure of the saliency of the path.

2. The method of claim 1 wherein each identified semantic relation contains a first semantic relation part, comprising the first word and relation type of the semantic relation, and a second semantic relation part, comprising the relation type and second word of the semantic relation, further including the steps of:

for each of the first and second semantic relation parts:
  for each relation type:
    determining the frequency of each unique semantic relation part,
    determining, for each frequency, the number of unique semantic relation parts having that frequency, called frequency-count, and
    generating a power curve approximating the distribution of frequency-count over frequency for the relation type;

for each selected path between the words of the pair:
  for the first semantic relation in the path:
    determining a first semantic relation part weight by dividing (the smaller of the frequency of the first semantic relation part and the value of the power curve for the first semantic relation part of the relation type of the semantic relation at the frequency of the first semantic relation part) by (the total number of semantic relation parts)and
    determining a second semantic relation part weight by dividing (the smaller of the frequency of the second semantic relation part and the value of the power curve for the second semantic relation part of the relation type of the semantic relation at the frequency of the second semantic relation part) by (the sum of the frequencies of second semantic relation parts having the relation type of the semantic relation) ; and
  for subsequent semantic relations in the path:
    determining a first semantic relation part weight by dividing (the smaller of the frequency of the first semantic relation part and the value of the power curve for the first semantic relation part of the relation type of the semantic relation at the frequency of the first semantic relation part) by (the sum of the frequencies of first semantic relation parts having the first word of the semantic relation), and
    determining a second semantic relation part weight by dividing (the smaller of the frequency of the second semantic relation part and the value of the power curve for the second semantic relation part of the relation type of the semantic relation at the frequency of the second semantic relation part) by (the sum of the frequencies of second semantic relation parts having the relation type of the semantic relation); and
  before multiplying the weight determined for each semantic relation in the path to obtain a measure of the saliency of the path, changing the semantic relation weight for each semantic relation to a weighted average of the semantic relation weight for the semantic relation and the product of the probabilities for the semantic relation parts making up the semantic relation, the average being weighted such that the relative weight of the semantic relation weight for the semantic relation increases with the frequency of the semantic relation.

3. A method in a computer system for identifying and evaluating the saliency of semantic relation paths between a pair of words using, a dictionary that contains word entries each for a word, the word entries in turn containing segments of natural language that characterize the word of the word entry, the method Comprising the steps of:

for each of the natural language segments of the word entries, constructing a semantic relation structure comprised of semantic relations occurring between words in the natural language segment, each semantic relation having a relation type and relating two of the words in the natural language segment;

for each relation type:
  determining the number of occurrences in the constructed semantic relation structures of each unique semantic relation having the relation type, called frequency,
  determining, for each frequency, the number of unique semantic relations having that frequency, called frequency-count, and
  generating a power curve approximating the distribution of frequency-count over frequency for the relation type;

for each word of the pair, collecting the semantic relation structures that relate the word of the pair to other words;

identifying an intersection word that occurs both in the semantic relation structures collected for the first word of the pair and in the semantic relation structures collected for the second word of the pair;

identifying in the semantic relation structures collected for the first word of the pair each path from the first word of the pair to the intersection word;

identifying in the semantic relation structures collected for the second word of the pair each path from the second word of the pair to the intersection word;

for each identified path from the first word of the pair to the intersection word or from the second word of the pair to the intersection word:
  for the first semantic relation in the path determining a semantic relation probability by dividing (the smaller of the frequency of the semantic relation and the value of the power curve for the relation type of the semantic relation at the frequency of the semantic relation) by (the total number of constructed semantic relations),
  for subsequent semantic relations in the path, determining a semantic relation probability by dividing (the smaller of the frequency of the semantic relation and the value of the power curve for the relation type of the semantic relation at the frequency of the semantic relation) by (the total number of constructed semantic relations beginning with the same word as the semantic relation), and
  multiplying the probability determined for each semantic relation in the path to obtain a measure of the saliency of the path; and for each combination of an identified path from the first word of the pair to the intersection word and an identified path from the second word of the pair to the intersection word:
  concatenating the combination of paths to form an extended path between the words of the pair, and
  determining a measure of the saliency of the extended path by multiplying together the measures of the saliency of both paths of the combination, then multiplying by a join probability reflecting the likely degree to which the meaning of the intersection word is the same in the different semantic relation structures containing the paths of the combination.

4. The method of claim 3, further comprising the steps of:
determining a level of similarity between the meanings of the intersection word in the different semantic relation structures containing the paths of the combination; and
determining the join probability based on the determined level of similarity.

5. A method in a computer system for identifying and weighting semantic relation paths between a pair of words using a corpus containing natural language incorporating the words of the pair, the method comprising the steps of:

identifying semantic relations occurring between words in the corpus, each semantic relation comprising a first word, a second word, and a relation type that relates the meaning of the first word to the meaning of the second word;

identifying paths among the identified semantic relations that each relate the pair of words; and for each identified path:
  generating a weight for each semantic relation in the path signifying the proximity of the frequency with which the semantic relation occurs in the corpus to an intermediate frequency with which semantic relations having the same relation type as the semantic relations occur in the corpus,
  conditioning the weights generated for semantic relations in the path other than the first one on the occurrence of the first word of the semantic relation, and
  multiplying the weight of the first semantic relation in the path and the conditioned weights of the other semantic relations in the path to obtain a weight for the entire path.

6. A computer-readable medium whose contents cause a computer system to weight semantic relation paths between a pair of words using a corpus containing natural language incorporating the words of the pair by performing the steps of:

identifying semantic relations occurring between words in the corpus, each semantic relation comprising a first word, a second word, and a relation type that relates the meaning of the first word to the meaning of the second word;

identifying paths among the identified semantic relations that each relate the pair of words; and for each identified path:
  generating a weight for each semantic relation in the path signifying the proximity of the frequency with which the semantic relation occurs in the corpus to an intermediate frequency with which semantic relations having the same relation type as the semantic relations occur in the corpus,
  conditioning the weights generated for semantic relations in the path other than the first one on the occurrence of the first word of the semantic relation, and multiplying the weight of the first semantic relation in the path and the conditioned weights of the other semantic relations in the path to obtain a weight for the entire path.

7. A method in computer system for determining the relevancy of semantic relations between words occurring in a knowledge base, the method comprising the steps of:

for a group of semantic relations occurring in the knowledge base, modeling with a mathematical function the relation between a frequency[] of occurrence of unique semantic relations and the number of unique semantic relations that occur at that frequency, the mathematical function having a vertex frequency; and determining the level of relevancy of unique semantic relations of the group such that the level of relevancy of unique semantic relations increase as the frequency of occurrence of the unique semantic relations approaches the vertex frequency of the mathematical function from either direction.

8. The method of claim 7 wherein each semantic relation in the knowledge base has one of a plurality of relation types, the method further including the steps of:

selecting one of the plurality of relation types; and selecting as the modeled group of semantic relations those semantic relations in the knowledge base having the selected relation type.

9. The method of claim 7 wherein the modeling step models the relation between a frequency of occurrence of unique semantic relations and the number of unique semantic relations that occur at that frequency as a power curve.

10. The method of claim 7 wherein the vertex frequency of the mathematical function is the frequency at which the value of the mathematical function is equal to the frequency.

11. The method of claim 7 wherein the vertex frequency of the mathematical function is the frequency at which the value of the first derivative of the mathematical function is equal to −1.

12. The method of claim 7 wherein the vertex frequency of the mathematical function is the frequency at which a graph of the mathematical function is nearest to the origin.

13. A computer-readable medium whose contents cause a computer system to determine the saliency of semantic relations between words occurring within a knowledge base by performing the steps of:

for a group of semantic relations occurring in the knowledge base, modeling with a mathematical function the relation between a frequency of occurrence of unique semantic relations and the number of unique semantic relations that occur at that frequency, the mathematical function having a vertex frequency; and determining the level of saliency of unique semantic relations of the group such that the level of saliency of unique semantic relations increase as the frequency of occurrence of the unique semantic relations approaches the vertex frequency of the mathematical function from either direction.

14. The computer-readable medium of claim 13 where each semantic relation in the knowledge base has one of a plurality of relation types, the contents of the computer-readable medium further causing the computer system to perform the steps of:

selecting one of the plurality of relation types; and selecting as the modeled group of semantic relations those semantic relations in the knowledge base having the selected relation type.

15. The computer-readable medium of claim 13 wherein the modeling step models the relation between a frequency of occurrence of unique semantic relations and the number of unique semantic relations that occur at that frequency as a power curve.

16. A method in a computer system for measuring the saliency of a semantic relation that occurs infrequently in a corpus, the semantic relation having a first part comprising a first word and a relation type and a second part comprising the relation type and a second word, the method comprising the steps of:

determining the frequency with which the first part of the semantic relation occurs in the corpus;

determining the frequency with which the second part of the semantic relation occurs in the corpus in connection with semantic relations of the relation type; and combining the determined frequencies to obtain a measure of the saliency of the semantic relation.

17. A method in a computer system for determining the relevancy of semantic relations between words occurring within a knowledge base, the method comprising the steps of:

for a group of semantic relations occurring in the semantic knowledge base, modeling with a mathematical function the statistical relation between a frequency of occurrence of unique semantic relations and the number of unique semantic relations that occur at that frequency, the mathematical function having a vertex frequency identifying a transition point in the mathematical function; and determining the level of relevancy of unique semantic relations of the group such that the level of relevancy of unique semantic relations increases as the frequency of occurrence of the unique semantic relations approaches the vertex frequency of the mathematical function.

18. A computer-readable medium whose contents cause a computer system to weight the relevancy of semantic relations between words occurring within a knowledge base by performing the steps of:

for a group of semantic relations occurring in the semantic knowledge base, modeling with a mathematical function the relation between a frequency of occurrence of unique semantic relations and the number of unique semantic relations that occur at that frequency, the mathematical function having a vertex frequency identifying a transition point in the mathematical function; and determining the level of relevancy of unique semantic relations of the group such that the level of relevancy of unique semantic relations increases as the frequency of occurrence of the unique semantic relations approaches the vertex frequency of the mathematical function.

19. A method in a computer system for determining the relevancy of a selected one of a plurality of semantic relations occurring within a knowledge base, each semantic relation comprising a first word, a second word, and a relation type relating the meanings of the first and second words, the method comprising the steps of:

for unique semantic relations occurring in the knowledge base having the same relation type as the selected semantic relation, modeling with a mathematical function having a vertex each of three statistical distributions:

the distribution of the number of unique semantic relations that occur in the corpus at each frequency, the distribution of the number of unique first words contained in relations of the relation type of the selected semantic relation that occur in the corpus at each frequency, and the distribution of the number of unique second words contained in relations of the relation type of the selected semantic relation that occur in the corpus at each frequency;

determining a first relevancy component for the selected semantic relation based on the proximity of the frequency of the selected semantic relation to the vertex of the mathematical function modeling the distribution of the number of unique semantic relations that occur in the corpus at each frequency;

determining a second relevancy component for the selected semantic relation based on the proximity of the frequency of first word and relation type of the selected semantic relation to the vertex of the mathematical function modeling the distribution of the number of unique first words contained in relations of the relation type of the selected semantic relation that occur in the corpus at each frequency, and based on the proximity of the frequency of relation type and second word of the selected semantic relation to the vertex of the mathematical function modeling the distribution of the number of unique second words contained in relations the unique semantic relations of the relation type of the selected semantic relation that occur in the corpus at each frequency; and combining the first and second relevancy components to obtain a measure of the relevancy of the selected semantic relation.

20. The method of claim 19 wherein the combining step computes a weighted average of the first and second relevancy components, the average being weighted such that the relative weight of the first relevancy component varies directly with the frequency of the selected semantic relation.

21. A method in a computer system for determining the relevance of an extended semantic relation path between a pair of words, the extended path being comprised of a plurality of subpaths each constituting a series of one or more semantic relations that, when concatenated, constitute a path between the words of the pair, the subpaths not being known to derive from the same segment of natural language, the method comprising the steps of:

for each subpath, determining a measure of the relevance of the subpath;

for each transition in the extended path between two subpaths, determining a measure of the relevance of the transition between the subpaths; and determining a measure of the relevance of the extended path by combining the measures of relevance of the subpaths with the measure of relevance of the transition.

22. The method of claim 21 wherein each transition between subpaths occurs at an intersection word, and wherein the step of determining a measure of the relevance of the transition between the subpaths includes the step of inverting a frequency characterizing the commonness of occurrences of the intersection word at which the transition occurs.

23. The method of claim 21 wherein each transition between subpaths occurs at an intersection word, and wherein the step of determining a measure of the relevance of the transition between the subpaths determines the relevance measure based upon the level of similarity between the meanings of the occurrences of the intersection word in each of the subpaths concatenated at the transition.

24. A computer-readable medium whose contents cause a computer system to weight the relevance of an extended semantic relation path between a pair of words, the extended path being comprised of a plurality of subpaths each constituting a series of one or more semantic relations that, when concatenated, constitute a path between the words of the pair, the subpaths not being known to derive from the same segment of natural language, by performing the steps of:

for each subpath, determining a weight characterizing the relevance of the subpath;

for each transition in the extended path between two subpaths, determining a weight characterizing the relevance of the transition between the subpaths; and determining a weight characterizing the relevance, of the extended path by combining the weight characterizing of relevance of the subpath with the weight characterizing relevance of the transitions.

25. The computer-readable medium of claim 24 wherein each transition between subpaths occurs at an intersection word, and wherein the step of determining a measure of the relevance of the transition between the subpaths determines a measure that is inversely related to a frequency characterizing the commonness of occurrence of the intersection word at which the transition occurs.

26. The computer-readable medium of claim 24 wherein each transition between subpaths occurs at an intersection word, and wherein the step of determining a measure of the relevance of the transition between the subpaths determines the relevance measure based upon the level of similarity between the meanings of the occurrences of the intersection word in each of the subpaths concatenated at the transition.

27. A method in a computer system for determining the relevancy of semantic relations between words occurring in a knowledge base, the method comprising the steps of:

for each unique semantic relation, determining the frequency of occurrences of that semantic relation in the knowledge base;

identifying a most-salient frequency of occurrence of semantic relations based on the determined frequencies, wherein any unique semantic relation with a frequency of occurrence that is near the most-salient frequency is a salient semantic relation; and assigning a saliency weight to each unique semantic relation that decreases as the difference between the determined frequency for the unique semantic relation and the identified most-salient frequency increases.

28. The method of claim 27, further comprising the step of compiling the knowledge base by deriving the semantic relations between words occurring in the knowledge base from the text of a natural language corpus.

29. The method of claim 27, further comprising the step of compiling the knowledge base by deriving the semantic relations between words occurring in the knowledge base from the text of a dictionary.

30. A computer memory containing a data structure for use in assessing the saliency of semantic relations occurring in a natural language corpus, the semantic relations each having one of a plurality of relation types, the data structure comprising:

for each of the plurality of relation types:
  for each unique semantic relation occurring in the corpus that has the relation type, an indication of the frequency at which the unique semantic relation occurs in the corpus, and
  information describing a power curve fitted to the relation of frequencies at which unique semantic relations of the relation type occur in the corpus and the number of relation types having each frequency of occurrence, the power curve having a vertex, such that, for a selected semantic relation of a selected relation type, the saliency of the selected semantic relation may be assessed by using the data structure to determine the distance between the vertex of the power curve for the selected relation type and the point on the power curve for the selected relation type corresponding to the frequency of occurrence of the selected semantic relation.

31. A computer memory containing a data structure for use in assessing the saliency of semantic relations occurring in a natural language corpus, the data structure comprising a plurality of semantic relation structures, each semantic relation structure relating the meaning of a head word of the semantic relation structure to a plurality of other words, each semantic relation structure having stored in conjunction with each such other word:

a nonextended path weight value providing a quantitative measure of the saliency of the semantic relation path occurring between the head word and the other word; and an extended path weight value providing a quantitative measure of the saliency of the semantic relation path occurring between the other word and the head word given the existence of another path to the other word, such that a quantitative measure of the saliency of the semantic relation path from a first word to a second word occurring in the natural language corpus can be determined by selecting the nonextended path weight value stored in conjunction with the second word in a semantic relation structure for which the first word is the head word, and such that a quantitative measure of the saliency of the semantic relation path from a third word to a fourth word occurring in the natural language corpus can be determined by identifying a fifth word in semantic relation structures having as their head word the third and forth words, and multiplying (the nonextended path weight value stored in conjunction with the fifth word in the semantic relation structure in which the third word is the head word) by (the extended path weight value stored in conjunction with the fifth word in the semantic relation structure in which the fourth word is the head word).

* * * * *

UNITED STATES PATENT AND TRADEMARK OFFICE
CERTIFICATE OF CORRECTION

PATENT NO. : 6,070,134
DATED : May 30, 2000
INVENTOR(S) : Richardson et al.

It is certified that error appears in the above-identified patent and that said Letters Patent is hereby corrected as shown below:

In the Specifications:

Column 1,
Lines 39-40, quotation marks before "with" omitted; quotations mark after "telescope" inverted indicating start of quote.

Column 2,
Line 4, "Structures" should be -- structures --.
Line 11, after "relation" insert -- in --.

Column 3,
Line 6, "it" should be -- a --.
Line 8, "step" should be -- steps --.
Line 12, "step" should be -- steps --.
Line 48, delete "(".

Column 8,
Lines 47, 49, 51, 53, "float" was not underlined as in original application.

Column 10,
Line 55, "Fv" should be -- $F_v$ --.

Column 11,
Line 27, "<3w>" should be -- <3> --.

Column 12,
Eq. 7, "F ($w_iR_i$ )" should be -F ($R_iW_i+_i$ ) ; at end "bRi3" should be -- $b_{Ri3}$ --.
Line 52, "a:i" should be -- an --.

Column 14,
Eq. 13, line 38, "wi" should be -- Wi --; after " ($w_1R_1w_2$) insert -- • --.
Line 51-52, "The C" should be -- These --.
Line 59, "c, f" should be -- of --.

Column 15,
Line 7, "tie" should be -- the --.
Line 42, "U.S. Pat." should be -- U.S. application number --.

UNITED STATES PATENT AND TRADEMARK OFFICE
CERTIFICATE OF CORRECTION

PATENT NO. : 6,070,134
DATED : May 30, 2000
INVENTOR(S) : Richardson et al.

It is certified that error appears in the above-identified patent and that said Letters Patent is hereby corrected as shown below:

Column 16,
Line 1, "step" should be -- steps --.
Line 17, delete ",".
Line 63, "tile" should be -- the --.

Column 17,
Line 7, "he" should be -- the --.

Column 18,
Line 8, after "relation" insert -- ) --.

Column 19,
Line 10, after "using" delete ",".
Line 13, lower case "c".

Column 21,
Line 10, delete "[ ]".

Column 24,
Line 17, delete ",".

Signed and Sealed this

Second Day of October, 2001

Attest:

*Nicholas P. Godici*

NICHOLAS P. GODICI
*Attesting Officer*     *Acting Director of the United States Patent and Trademark Office*